United States Patent
Frey

(10) Patent No.: US 9,581,721 B2
(45) Date of Patent: Feb. 28, 2017

(54) METHOD FOR MAKING DOWNHOLE ELECTROMAGNETIC LOGGING WHILE DRILLING MEASUREMENTS

(71) Applicant: Schlumberger Technology Corporation, Sugar Land, TX (US)

(72) Inventor: Mark Frey, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 14/285,581

(22) Filed: May 22, 2014

(65) Prior Publication Data

US 2015/0276967 A1  Oct. 1, 2015

Related U.S. Application Data

(60) Provisional application No. 61/972,291, filed on Mar. 29, 2014.

(51) Int. Cl.
  *G01V 3/26* (2006.01)
  *G01V 3/38* (2006.01)
  *G01V 3/30* (2006.01)

(52) U.S. Cl.
  CPC . *G01V 3/38* (2013.01); *G01V 3/30* (2013.01)

(58) Field of Classification Search
  CPC ... G01V 3/28; G01V 3/30; G01V 3/38; G01V 13/00; G01V 3/108; G01V 3/26; E21B 47/026
  (Continued)

(56) References Cited

U.S. PATENT DOCUMENTS 5,235,285 A  8/1993  Clark et al.
5,585,790 A  12/1996  Luling et al.
(Continued)

FOREIGN PATENT DOCUMENTS

EP  0721111 A2  7/1996
EP  2320251 A2  5/2011
(Continued)

OTHER PUBLICATIONS

Zhong, "DDRB Measurement Construction", Retrieved from the Internet: URL: http://omniworks.slb.com/support/OmniWorks/ARL/Fetch/File?objName=em_ans\DDR_EMLA\FwdModeling\Core\DDRB_measurement_construction.docx, pp. 1-27; May 2011.

(Continued)

*Primary Examiner* — Jay Patidar

(57) ABSTRACT

A method for obtaining fully gain compensated propagation measurements includes rotating an electromagnetic logging while drilling tool in a subterranean wellbore. The tool includes first and second transmitters and first and second receivers axially spaced apart from one another in which each of the transmitters and each of the receivers include an axial antenna and collocated first and second transverse antennas. The first and second transverse antennas in the first receiver are rotationally offset by a predefined angle from the first and second transverse antennas in the first transmitter. A plurality of electromagnetic voltage measurements are acquired at the first and second receivers while rotating and processed to compute harmonic coefficients. The harmonic coefficients are mathematically rotated through at least the predefined angle to obtain rotated coefficients. Ratios of selected ones of the rotated coefficients are processed to compute fully gain compensated measurement quantities.

25 Claims, 10 Drawing Sheets

(58) Field of Classification Search
USPC .................................................. 324/338–343
See application file for complete search history.

(56) References Cited

U.S. PATENT DOCUMENTS

| | | | |
|---|---|---|---|
| 5,594,343 A | 1/1997 | Clark et al. | |
| 5,757,191 A | 5/1998 | Gianzero | |
| 6,147,496 A | 11/2000 | Strack et al. | |
| 6,294,917 B1 | 9/2001 | Nichols | |
| 6,768,105 B2 | 7/2004 | Mullins et al. | |
| 6,788,065 B1 | 9/2004 | Homan et al. | |
| 6,819,111 B2 | 11/2004 | Fanini et al. | |
| 6,911,824 B2 | 6/2005 | Bittar | |
| 6,969,994 B2 | 11/2005 | Minerbo et al. | |
| 7,095,012 B2 | 8/2006 | Fujisawa et al. | |
| 7,305,306 B2 | 12/2007 | Venkataramanan et al. | |
| 7,382,135 B2 | 6/2008 | Li et al. | |
| 7,389,159 B2 | 6/2008 | Warren et al. | |
| 7,536,261 B2 | 5/2009 | Omeragic et al. | |
| 7,548,887 B1 | 6/2009 | Ogino et al. | |
| 7,825,664 B2 | 11/2010 | Homan et al. | |
| 7,848,887 B2 | 12/2010 | Yang et al. | |
| 7,915,895 B2 | 3/2011 | Chemali et al. | |
| 7,916,092 B2 | 3/2011 | Homan et al. | |
| 7,966,273 B2 | 6/2011 | Hegeman et al. | |
| 7,990,153 B2 | 8/2011 | Streinz et al. | |
| 7,991,555 B2 | 8/2011 | Yang et al. | |
| 8,274,289 B2 | 9/2012 | Bittar et al. | |
| 8,368,403 B2 | 2/2013 | Homan et al. | |
| 8,407,005 B2 | 3/2013 | Zhdanov et al. | |
| 8,466,683 B2 | 6/2013 | Legendre et al. | |
| 2003/0057950 A1 | 3/2003 | Gao et al. | |
| 2003/0085707 A1 | 5/2003 | Minerbo et al. | |
| 2003/0184304 A1 | 10/2003 | Homan et al. | |
| 2004/0183538 A1 | 9/2004 | Hanstein et al. | |
| 2004/0196047 A1 | 10/2004 | Fanini et al. | |
| 2004/0207403 A1 | 10/2004 | Fanini et al. | |
| 2006/0043973 A1 | 3/2006 | Chen et al. | |
| 2006/0253255 A1 | 11/2006 | Omeragic et al. | |
| 2007/0024286 A1 | 2/2007 | Wang | |
| 2008/0078550 A1 | 4/2008 | Chatterji et al. | |
| 2008/0079580 A1 | 4/2008 | Shelton et al. | |
| 2008/0143336 A1 | 6/2008 | Legendre et al. | |
| 2009/0015261 A1 | 1/2009 | Yang et al. | |
| 2009/0309600 A1 | 12/2009 | Seydoux et al. | |
| 2010/0277176 A1 | 11/2010 | Homan et al. | |
| 2011/0074427 A1 | 3/2011 | Wang et al. | |
| 2011/0238312 A1 | 9/2011 | Seydoux et al. | |
| 2011/0291855 A1 | 12/2011 | Homan et al. | |
| 2011/0309833 A1 | 12/2011 | Yang | |
| 2012/0105076 A1 | 5/2012 | Li et al. | |
| 2012/0166086 A1 | 6/2012 | Zhong et al. | |
| 2012/0242342 A1 | 9/2012 | Rabinovich et al. | |
| 2012/0286790 A1* | 11/2012 | Yang | G01V 3/28 324/338 |
| 2013/0035862 A1 | 2/2013 | Fang et al. | |
| 2013/0073206 A1 | 3/2013 | Hou et al. | |
| 2013/0141104 A1 | 6/2013 | Homan et al. | |
| 2013/0191028 A1 | 7/2013 | Homan et al. | |
| 2013/0301388 A1 | 11/2013 | Hartmann et al. | |
| 2013/0304384 A1 | 11/2013 | Rabinovich | |
| 2014/0096955 A1 | 4/2014 | Indo et al. | |
| 2014/0292341 A1* | 10/2014 | Yang | G01V 3/28 324/339 |
| 2015/0276968 A1 | 10/2015 | Frey | |
| 2015/0276971 A1 | 10/2015 | Frey | |
| 2015/0276972 A1 | 10/2015 | Frey | |

FOREIGN PATENT DOCUMENTS

| | | |
|---|---|---|
| KR | 100264630 B1 | 6/2000 |
| WO | 2009009342 A1 | 1/2009 |
| WO | 2013095997 A1 | 6/2013 |
| WO | 2014003701 A1 | 1/2014 |
| WO | 2014003702 A1 | 1/2014 |
| WO | 2015027002 A1 | 2/2015 |
| WO | 2015027010 A1 | 2/2015 |

OTHER PUBLICATIONS

Efron, "Bootstrap methods: Another look at the Jackknife", The Annals of Statistics, vol. 7, No. 1, 1979, pp. 1-26.

Frey, et al., "A Retrievable and Reseatable Propagation Resistivity Tool for Logging While Drilling and Logging While Tripping", SPE ATCE, San Antonio, Texas, SPE 103066, Sep. 24-27, 2006.

Hegeman, et al., "Application of Artificial Neural Networks to Downhole Fluid Analysis", Paper IPTC 11268 PP, presented at the International Petroleum Technology Conference, Dubai, U.A.E., published SPEREE as SPE 123423, Feb. 2009.

Stine, "Bootstrap Prediction Intervals for Regression", Journal of the American Statistical Association, vol. 80, No. 392, Dec. 1985, pp. 1026-1031.

International Search Report and Written Opinion issued in related International Application No. PCT/US2015/022736, on Jun. 26, 2015, 10 pages.

International Search Report and Written Opinion issued in related International Application No. PCT/US2015/022737, on Jun. 26, 2015, 11 pages.

International Search Report and Written Opinion issued in related International Application No. PCT/US2015/022744, on Jun. 26, 2015, 10 Pages.

International Search Report and Written Opinion issued in related International Application No. PCT/US2015/022866, on Jun. 29, 2015, 15 pages.

International Search Report and Written Opinion issued in related International Application No. PCT/US2015/022770, on Jun. 30, 2015, 13 pages.

* cited by examiner

METHOD FOR MAKING DOWNHOLE ELECTROMAGNETIC LOGGING WHILE DRILLING MEASUREMENTS

CROSS REFERENCE TO RELATED APPLICATIONS

This application claims the benefit of U.S. Provisional Application Ser. No. 61/972,291 entitled Compensated Deep Propagation Tensor Measurement with Orthogonal Antennas, filed Mar. 29, 2014.

FIELD OF THE INVENTION

Disclosed embodiments relate generally to downhole electromagnetic logging and more particularly to a method for making fully gain compensated tri-axial propagation measurements, such as phase shift and attenuation measurements, using orthogonal antennas.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed e.g., in pay-zone steering applications, to provide information upon which steering decisions may be made.

Downhole electromagnetic measurements are commonly inverted at the surface using a formation model to obtain various formation parameters, for example, including vertical resistivity, horizontal resistivity, distance to a remote bed, resistivity of the remote bed, dip angle, and the like. One challenge in utilizing directional electromagnetic resistivity measurements, is obtaining a sufficient quantity of data to perform a reliable inversion. The actual formation structure is frequently significantly more complex than the formation models used in the inversion. The use of a three-dimensional matrix of propagation measurements may enable a full three-dimensional measurement of the formation properties to be obtained as well as improve formation imaging and electromagnetic look ahead measurements. However, there are no known methods for providing a fully gain compensated tri-axial propagation measurement.

SUMMARY

A method for obtaining fully gain compensated propagation measurements is disclosed. The method includes rotating an electromagnetic logging while drilling tool in a subterranean wellbore. The tool includes first and second transmitters and first and second receivers axially spaced apart from one another in which each of the first and second transmitters and first and second receivers include an axial antenna and collocated first and second transverse antennas. The first and second transverse antennas in the first receiver are rotationally offset by a predefined angle from the first and second transverse antennas in the first transmitter. A plurality of electromagnetic voltage measurements are acquired using the first and second receivers while rotating. The measurements are processed to compute harmonic coefficients which are in turn mathematically rotated through at least the predefined angle to obtain rotated coefficients. Ratios of selected ones of the rotated coefficients are processed to compute fully gain compensated measurement quantities.

The disclosed embodiments may provide various technical advantages. For example, the disclosed methodology provides a method for obtaining a gain compensated three-dimensional matrix of measurements using orthogonal antennas. The acquired measurements are fully gain compensated and independent of antenna tilt angle variation. Moreover, the disclosed method and apparatus tends to be insensitive to bending and alignment angle errors.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
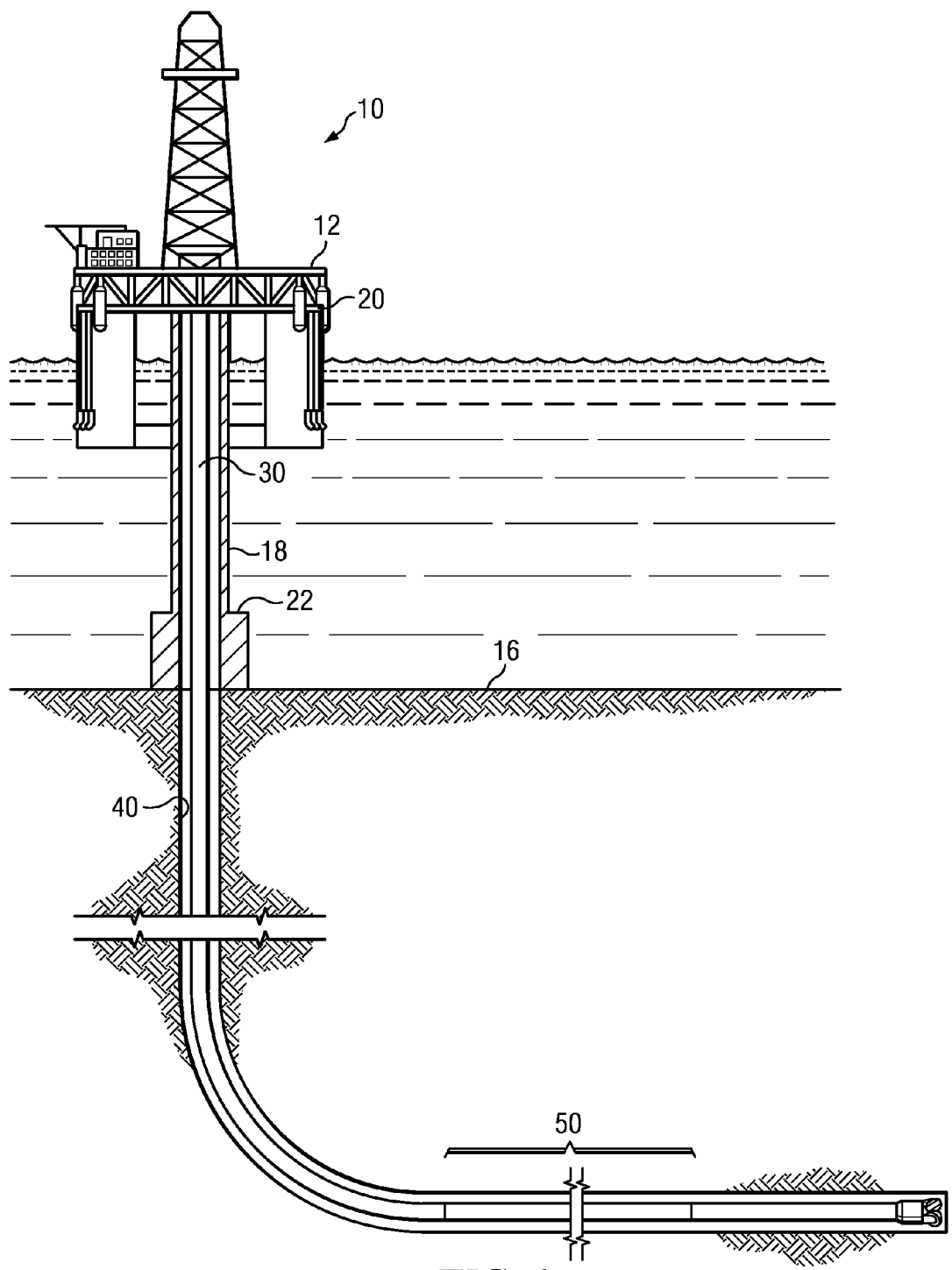
FIG. 1 depicts one example of a drilling rig on which the disclosed electromagnetic logging tools and methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes a deep reading electromagnetic measurement tool 50 configured to make tri-axial electromagnetic logging measurements. As described in more detail below the deep reading electromagnetic measurement tool 50 may include multiple orthogonal antennas deployed on at least first and second axially spaced subs.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

Figure 2A:
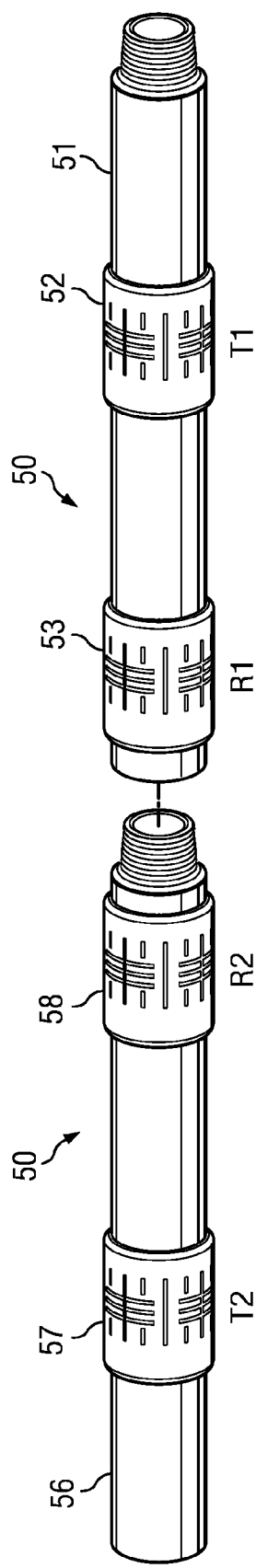
FIG. 2A depicts one example of the deep reading electromagnetic logging tool shown on FIG. 1.
Figure 2B:
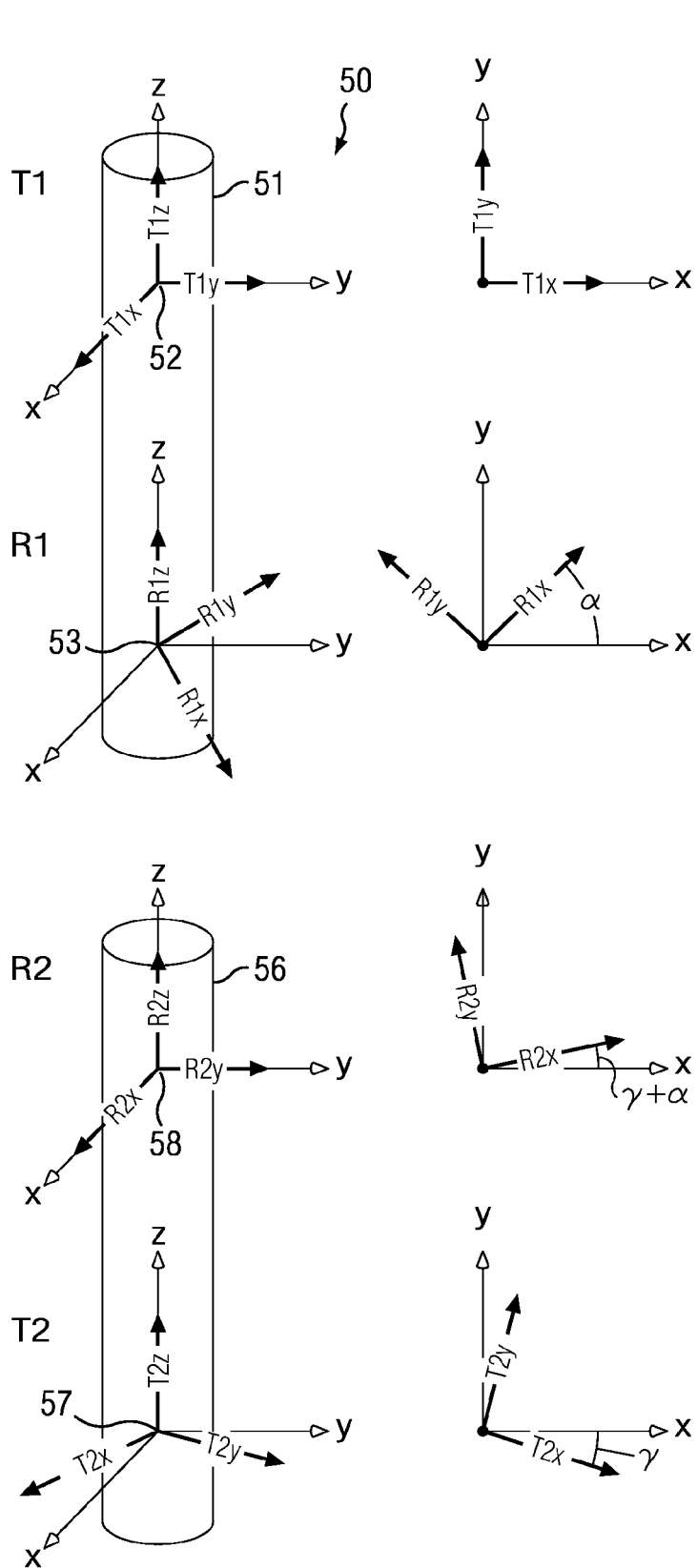
FIG. 2B schematically depicts a deep reading electromagnetic logging tool including collocated triaxial transmitters and receivers.
Figure 2C:
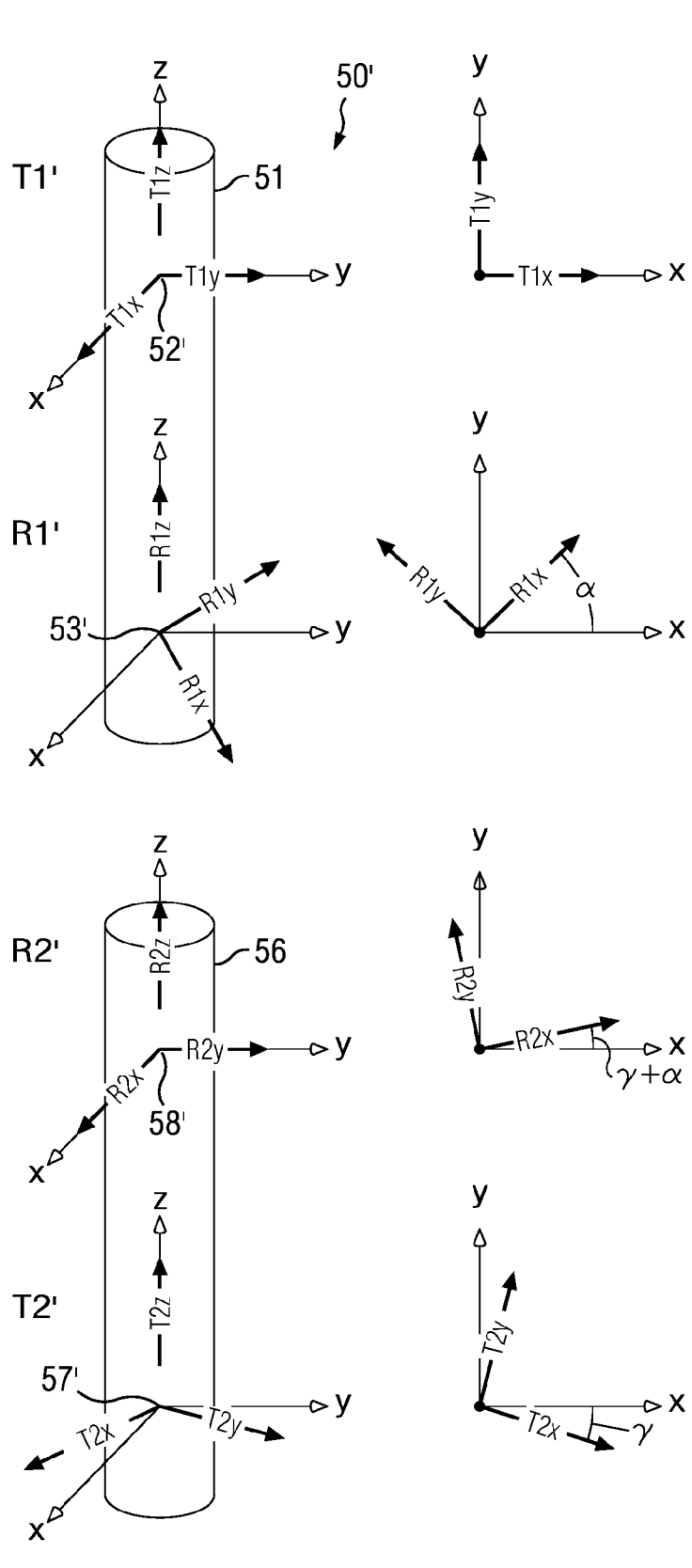
FIG. 2C schematically depicts another deep reading electromagnetic logging tool embodiment including transmitters and receivers having axial and orthogonal antennas.

FIGS. 2A, 2B, and 2C (collectively FIG. 2) depict electromagnetic measurement tool embodiments 50 and 50'. FIG. 2A depicts one example of an electromagnetic measurement tool 50. In the depicted embodiment measurement tool 50 includes a first transmitter 52 and a first receiver 53 deployed on a first sub 51 and a second transmitter 57 and a second receiver 58 deployed on a second sub 56. The first and second subs 51 and 56 may be axially spaced apart substantially any suitable distance to achieve a desired measurement depth. While not shown, other BHA tools may deployed between subs 51 and 56. As described in more detail below each of the transmitters 52 and 57 and receivers 53 and 58 includes three tri-axial antennas (an axial antenna and first and second transverse antennas that are orthogonal to one another in this particular embodiment). As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein).

FIG. 2B depicts the antenna moments for transmitters 52 and 57 and receivers 53 and 58 on electromagnetic measurement tool 50. Transmitter 52 (T1) includes three collocated tri-axial antennas T1x, T1y, and T1z. The antennas T1x, T1y, and T1z have mutually orthogonal moments that are aligned with the x-, y-, and z-directions. Receiver 53 (R1) also includes three collocated tri-axial antennas R1x, R1y, and R1z. The antennas R1x, R1y, and R1z also have mutually orthogonal moments. The moment of antenna R1z is aligned with the moment of antenna T1z (and the z axis) while moments the moments of antennas R1x and R1y are rotationally offset from the moments of antennas T1x and T1y by an offset angle alpha=45 degrees. As depicted sub 56 is rotationally offset (about the axis of the drill string, the z-axis) with respect to sub 51 by a misalignment angle gamma such that transmitter T2 and receiver R2 are rotationally offset with respect transmitter T1 and receiver R1. Transmitter 57 (T2) includes collocated tri-axial antennas T2x, T2y, and T2z. The antennas T2x, T2y, and T2z have mutually orthogonal moments. The moment of antenna T2z is aligned with the z-axis while the moments of antennas T2x and T2y are rotationally offset from the moments of antennas T1x and T1y by the angle gamma (as depicted at 55). Receiver 58 (R2) also includes collocated tri-axial antennas R2x, R2y, and R2z. The antennas R2x, R2y, and R2z have mutually orthogonal moments. The moment of antenna R2z is aligned with the moment of antenna T2z while the moments of antennas R2x and R2y are rotationally offset from the moments of antennas T2x and T2y by alpha=45 degrees and from the moments of antennas T1x and T1y by alpha+gamma degrees. The disclosed embodiment tends to be advantageous in that it ensures that the reception of a non-zero signal at each of the x- and y-axis receivers when the x- and y-axis transmitters are fired.

It will be understood that the offset angle α is not necessarily 45 degrees as depicted on FIG. 2B, but may be substantially any non-zero, non-ninety degree angle. An offset angle α in a range from about 30 to about 60 degrees is generally preferred, although by no means required. It will also be understood that the misalignment angle γ is the result of a rotational misalignment between subs 51 and 56 during make-up of the drill string. As such the misalignment angle γ may have substantially any value.

FIG. 2C depicts an alternative (and more general) electromagnetic measurement tool embodiment 50'. Measurement tool 50' is similar to measurement tool 50 (FIGS. 2A and 2B) in that it includes a first tri-axial transmitter T1' and a first tri-axial receiver R1' deployed on a first sub 51' and a second tri-axial transmitter T2' and a second tri-axial receiver R2' deployed on a second sub 56'. Measurement tool 50' differs from measurement tool 50 in that the z-axis transmitter antennas T1z' and T2z' and the z-axis receiver antennas R1z' and R2z' are not collocated with the corresponding x- and y-axis transmitter and receiver antennas, but are axially offset therefrom. In general, the x- and y-axis transmitter and receiver antennas are collocated with one another while collocation of any one or more of the corresponding z-axis antennas is optional.

Figures 3A, 3B:
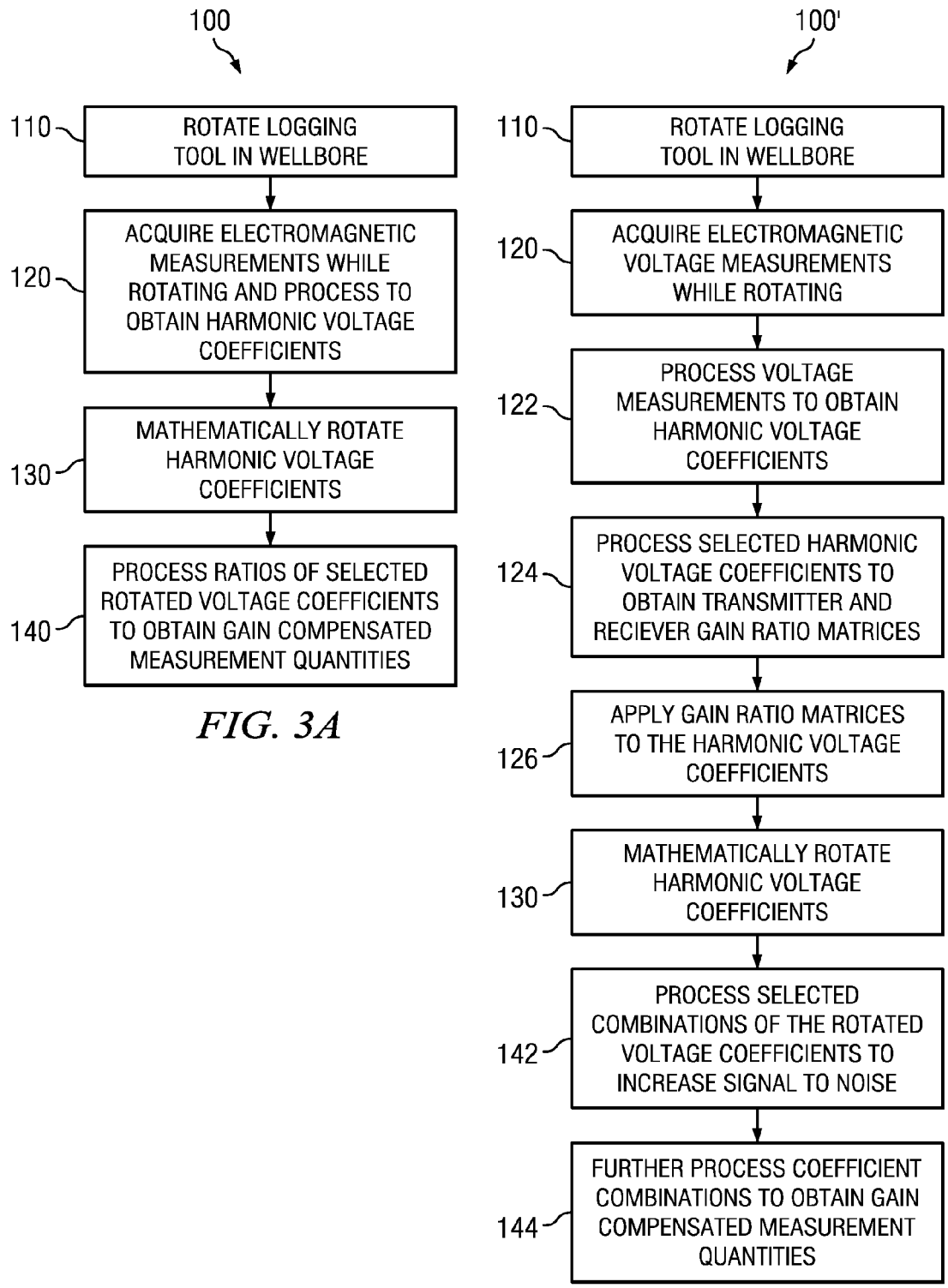
FIG. 3A depicts a flow chart of a disclosed method embodiment.
FIG. 3B depicts a flow chart of another disclosed method embodiment.

FIG. 3A depicts a flow chart of one disclosed method embodiment 100. An electromagnetic measurement tool (e.g., measurement tool 50 or 50' on FIG. 2) is rotated in a subterranean wellbore at 110. Electromagnetic measurements are acquired at 120 while the tool is rotating and processed to obtain harmonic voltage coefficients. The harmonic voltage coefficients are rotated mathematically at 130 to simulate rotation of the x and y antennas in the R1 and R2 receivers and the T2 transmitter such that they are rotationally aligned with the x and y antennas in the T1 transmitter. Such rotation removes the effect of the offset angle α and misalignment angle γ on the measurements. Ratios of selected ones of the rotated voltage coefficients may then be processed to obtain gain compensated measurement quantities at 140.

FIG. 3B depicts a flow chart of an optional, more detailed embodiment 100' of the method 100 depicted on FIG. 3A. An electromagnetic measurement tool is rotated in a subterranean wellbore at 110. A three dimensional matrix of electromagnetic voltage measurements is acquired at 120 while rotating. The acquired measurements are processed at 122 to obtain harmonic voltage coefficients (e.g., the DC, first harmonic cosine, first harmonic sine, second harmonic cosine, and second harmonic sine coefficients). At 124, selected ones of the harmonic voltage coefficients are processed to obtain transmitter and receiver gain ratio matrices. The harmonic voltage coefficients may be selected, for example, so that the gain ratio matrices replace the y transmitter and y receiver gains with x transmitter and x receiver gains when applied to the harmonic voltage coefficients. These gain ratio matrices may then be applied to the harmonic voltage coefficients at 126. The harmonic voltage coefficients (with the applied gain ratio matrices) are rotated mathematically at 130 as described above with respect to FIG. 3A. At 142, selected combinations of the rotated measurements obtained in 130 may be processed to obtain coefficient combinations and thereby increase the signal to noise ratio of the measurements. Selected ratios of these coefficient combinations may then be further processed at 144 to obtain gain compensated measurement quantities.

As is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennas can be processed, as is known to those of ordinary skill in the art, to obtain one or more properties of the formation.

In general the earth is anisotropic such that its electrical properties may be expressed as a three-dimensional tensor which contains information on formation resistivity anisotropy, dip, bed boundaries and other aspects of formation geometry. It will be understood by those of ordinary skill in the art that the mutual couplings between the tri-axial transmitter antennas and the tri-axial receiver antennas depicted on FIGS. 2B and 2C form a three-dimensional matrix and thus may have sensitivity to a full three-dimensional formation impedance tensor. For example, a three-dimensional matrix of measured voltages V may be expressed as follows:

$$V_{ij} = \begin{bmatrix} V_{ijxx} & V_{ijxy} & V_{ijxz} \\ V_{ijyx} & V_{ijyy} & V_{ijyz} \\ V_{ijzx} & V_{ijzy} & V_{ijzz} \end{bmatrix} = I_i Z_{ij} = \begin{bmatrix} I_{ix} & 0 & 0 \\ 0 & I_{iy} & 0 \\ 0 & 0 & I_{iz} \end{bmatrix} \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (1)$$

where $V_{ij}$ represent the three-dimensional matrix of measured voltages, with i indicating the corresponding transmitter triad (e.g., T1 or T2) and j indicating the corresponding receiver triad (e.g., R1 or R2), $I_i$ represent the transmitter currents, and $Z_{ij}$ represent the transfer impedances which depend on the electrical and magnetic properties of the environment surrounding the antenna pair in addition to the frequency, geometry, and spacing of the antennas. The third and fourth subscripts indicate the axial orientation of the transmitter and receiver antennas. For example, $V_{12xy}$ represents a voltage measurement on the y-axis antenna of receiver R2 from a firing of the x-axis antenna of transmitter T1.

When bending of the measurement tool is negligible (e.g., less than about 10 degrees), the measured voltages may be modeled mathematically, for example, as follows:

$$V_{ij} = G_{Ti} m_{Ti}^t R_\theta^t Z_{ij} R_\theta m_{Rj} G_{Rj} \quad (2)$$

where $Z_{ij}$ are matrices representing the triaxial tensor couplings (impedances) between the locations of transmitter i and receiver j, $G_{Ti}$ and $G_{Rj}$ are diagonal matrices representing the transmitter and receiver gains, $R_\theta$ represents the rotation matrix about the z-axis through angle $\theta$, $m_{Ti}$ and $m_{Rj}$ represent the matrices of the direction cosines for the transmitter and receiver moments at $\theta = 0$, and the superscript t represents the transpose of the corresponding matrix. The matrices in Equation 2 may be given, for example, as follows:

$$Z_{ij} = \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (3)$$

$$G_{Ti} = \begin{bmatrix} g_{Tix} & 0 & 0 \\ 0 & g_{Tiy} & 0 \\ 0 & 0 & g_{Tiz} \end{bmatrix} \quad (4)$$

$$G_{Rj} = \begin{bmatrix} g_{Rjx} & 0 & 0 \\ 0 & g_{Rjy} & 0 \\ 0 & 0 & g_{Rjz} \end{bmatrix} \quad (5)$$

$$R_\theta = \begin{bmatrix} \cos(\theta) & -\sin(\theta) & 0 \\ \sin(\theta) & \cos(\theta) & 0 \\ 0 & 0 & 1 \end{bmatrix} \quad (6)$$

Using the T1x antenna direction as a reference direction, the matrices of the direction cosines of the transmitter and receiver moments may be given, for example, as follows:

$$m_{T1} = I$$
$$m_{R1} = R_\alpha$$
$$m_{R2} = R_\gamma R_\alpha$$
$$m_{T2} = R_\gamma \quad (7)$$

where I represents the identity matrix, $R_\alpha$ represents the rotation matrix about the z-axis through the angle $\alpha$, and $R_\gamma$ represents the rotation matrix about the z-axis through the angle $\gamma$.

Substituting Equation 7 into Equation 2 yields the following mathematical expressions:

$$V_{11} = G_{T1}(R_\theta^t Z_{11} R_\theta) R_\alpha G_{R1}$$
$$V_{12} = G_{T1}(R_\theta^t Z_{12} R_\theta) R_\gamma R_\alpha G_{R2}$$
$$V_{21} = G_{T2} R_\gamma^t (R_\theta^t Z_{21} R_\theta) R_\alpha G_{R1}$$
$$V_{22} = G_{T2} R_\gamma^t (R_\theta^t Z_{22} R_\theta) R_\gamma R_\alpha G_{R2} \quad (8)$$

The rotated tensor couplings (shown in the parentheses in Equation 8) may be expressed mathematically in harmonic form, for example, as follows:

$$R_\theta^t Z_{ij} R_\theta = Z_{DC\_ij} + Z_{FHC\_ij}\cos(\theta) + Z_{FHS\_ij}\sin(\theta) + Z_{SHC\_ij}\cos(2\theta) + Z_{SHS\_ij}\sin(2\theta) \quad (9)$$

where $Z_{DC\_ij}$ represents a DC (average) coupling coefficient, and $Z_{FHC\_ij}$ and $Z_{FHS\_ij}$ represent first order harmonic cosine and first order harmonic sine coefficients (referred to herein as first harmonic cosine and first harmonic sine coefficients), and $Z_{SHC\_ij}$ and $Z_{SHS\_ij}$ represent second order harmonic cosine and second order harmonic sine coefficients (referred to herein as second harmonic cosine and second harmonic sine coefficients) of the couplings. These coefficients are shown below:

$$Z_{DC\_ij} = \begin{bmatrix} \frac{Z_{ijxx}+Z_{ijyy}}{2} & \frac{(Z_{ijxy}-Z_{ijyx})}{2} & 0 \\ \frac{-(Z_{ijxy}-Z_{ijyx})}{2} & \frac{Z_{ijxx}+Z_{ijyy}}{2} & 0 \\ 0 & 0 & Z_{ijzz} \end{bmatrix} \quad (10)$$

$$Z_{FHC\_ij} = \begin{bmatrix} 0 & 0 & Z_{ijxz} \\ 0 & 0 & Z_{ijyz} \\ Z_{ijzx} & Z_{ijzy} & 0 \end{bmatrix}$$

$$Z_{FHS\_ij} = \begin{bmatrix} 0 & 0 & Z_{ijyz} \\ 0 & 0 & -Z_{ijxz} \\ Z_{ijzy} & -Z_{ijzx} & 0 \end{bmatrix}$$

-continued $$Z_{SHC\_ij} = \begin{bmatrix} \frac{Z_{ijxx} - Z_{ijyy}}{2} & \frac{(Z_{ijxy} + Z_{ijyx})}{2} & 0 \\ \frac{(Z_{ijxy} + Z_{ijyx})}{2} & -\frac{(Z_{ijxx} + Z_{ijyy})}{2} & 0 \\ 0 & 0 & 0 \end{bmatrix}$$

$$Z_{SHS_{ij}} = \begin{bmatrix} \frac{(Z_{ijxy} + Z_{ijyx})}{2} & -\frac{(Z_{ijxx} - Z_{ijyy})}{2} & 0 \\ -\frac{(Z_{ijxx} - Z_{ijyy})}{2} & -\frac{(Z_{ijxy} + Z_{ijyx})}{2} & 0 \\ 0 & 0 & 0 \end{bmatrix}$$

As stated above, the receiver antenna voltages are measured at 120 while the tool rotates at 100 (FIGS. 3A and 3B). Following the form of Equation 9, the measured voltages may be expressed mathematically in terms of their harmonic voltage coefficients, for example, as follows thereby enabling the harmonic coefficients to be obtained (e.g., at 122 in FIG. 3B):

$$V_{ij} = V_{DC\_ij} + V_{FHC\_ij}\cos(\theta) + V_{FHS\_ij}\sin(\theta) + V_{SHC\_ij}\cos(2\theta) + V_{SHS\_ij}\sin(2\theta) \quad (11)$$

Following Equation 2, the DC, first harmonic, and second harmonic voltage coefficients may be modeled, for example, as follows:

$$V_{DC\_ij} = G_{Ti} m_{Ti}^t Z_{DC\_ij} m_{Rj} G_{Rj}$$

$$V_{FHC\_ij} = G_{Ti} m_{Ti}^t Z_{FHC\_ij} m_{Rj} G_{Rj}$$

$$V_{FHS\_ij} = G_{Ti} m_{Ti}^t Z_{FHS\_ij} m_{Rj} G_{Rj}$$

$$V_{SHC\_ij} = G_{Ti} m_{Ti}^t Z_{SHC\_ij} m_{Rj} G_{Rj}$$

$$V_{SHS\_ij} = G_{Ti} m_{Ti}^t Z_{SHS\_ij} m_{Rj} G_{Rj} \quad (12)$$

In one disclosed embodiment gain compensation may be accomplished by obtaining ratios between the x and y and receiver gains and the x and y transmitter gains (e.g., at 124 in FIG. 3B). The DC voltage measurements at receiver R1 upon firing transmitter T1 may be expressed as follows:

$$V_{DC\_11} = \begin{bmatrix} V_{DC\_11xx} & V_{DC\_11xy} & V_{DC\_11xz} \\ V_{DC\_11yx} & V_{DC\_11yy} & V_{DC\_11yz} \\ V_{DC\_11zx} & V_{DC\_11zy} & V_{DC\_11zz} \end{bmatrix} \quad (13)$$

From Equations 10 and 12, the measured DC voltages $V_{DC\_11}$ may be expressed as a function of the couplings (impedances), gains, and the angle $\alpha$, for example, as follows:

$$\begin{bmatrix} g_{T1x}g_{R1x}\left[\frac{(Z_{11xx}+Z_{11yy})}{2}\cos(\alpha) + \frac{(Z_{11xy}-Z_{11yx})}{2}\sin(\alpha)\right] & g_{T1x}g_{R1y}\left[\frac{(Z_{11xy}-Z_{11yx})}{2}\cos(\alpha) - \frac{(Z_{11xx}+Z_{11yy})}{2}\sin(\alpha)\right] & 0 \\ -g_{T1y}g_{R1x}\left[\frac{(Z_{11xy}-Z_{11yx})}{2}\sin(\alpha) - \frac{(Z_{11xx}+Z_{11yy})}{2}\cos(\alpha)\right] & g_{T1y}g_{R1y}\left[\frac{(Z_{11xx}+Z_{11yy})}{2}\cos(\alpha) + \frac{(Z_{11xy}-Z_{11yx})}{2}\sin(\alpha)\right] & 0 \\ 0 & 0 & g_{T1z}g_{T1z}Z_{11zz} \end{bmatrix} \quad (14)$$

Taking the ratio between the DC xx and yy voltage measurements yields:

$$\frac{V_{DC\_11xx}}{V_{DC\_11yy}} = \frac{g_{R1x}}{g_{R1y}} \frac{g_{T1x}}{g_{T1y}} \quad (15)$$

Likewise, taking the ratio between the DC voltage xy and yx measurements yields:

$$\frac{V_{DC\_11xy}}{V_{DC\_11yx}} = -\frac{g_{R1y}}{g_{R1x}} \frac{g_{T1x}}{g_{T1y}} \quad (16)$$

where $g_{R1x}$ and $g_{R1y}$ represent the gains of the x and y antenna on receiver R1 and $g_{T1x}$ and $g_{T1y}$ represent the gains of the x and y antenna on transmitter T1. Equations 15 and 16 may be combined to obtain measured quantities that are equivalent to a gain ratio of the x and y receiver and a gain ratio of the x and y transmitter, for example, as follows:

$$gR1 \stackrel{def}{=} \sqrt{-\frac{V_{DC_{11xx}}}{V_{DC_{11yy}}} \frac{V_{DC_{11yx}}}{V_{DC_{11xy}}}} = \frac{g_{R1x}}{g_{R1y}} \quad (17)$$

$$gT1 \stackrel{def}{=} \sqrt{-\frac{V_{DC\_11xx}}{V_{DC\_11yy}} \frac{V_{DC\_11xy}}{V_{DC\_11yx}}} = \frac{g_{T1x}}{g_{T1y}}$$

Since the gain ratio formulas in Equation 17 involve taking a square root, there may be a 180 degree phase ambiguity (i.e., a sign ambiguity). As such, the gain ratios may not be arbitrary, but should be controlled such that they are less than 180 degrees. For un-tuned receiving antennas, the electronic and antenna gain/phase mismatch (assuming the antenna wires are not flipped from one receiver to another) may generally be controlled to within about 30 degrees (particularly at the lower frequencies used for deep measurements). This is well within 180 degrees (even at elevated temperatures where the mismatch may be at its greatest). For tuned transmitting antennas, however, the phase may change signs (i.e., jump by 180 degrees) if the drift in the antenna tuning moves across the tuning resonance. Such transmitter phase ratio ambiguity (sign ambiguity) may be resolved, for example, using Equations 15 and 16 and the knowledge that the receiver gain/phase ratio is not arbitrary, but limited to about 30 degrees (i.e. to enable the determination of whether the transmitter phase difference is closer to 0 or 180 degrees).

The x and y gain ratios defined in Equation 17 enable the following gain ratio matrices to be defined (e.g., at 124 in FIG. 3B):

$$G_{R1\_ratio} \stackrel{def}{=} \begin{bmatrix} 1 & 0 & 0 \\ 0 & gR1 & 0 \\ 0 & 0 & 1 \end{bmatrix} = \begin{bmatrix} 1 & 0 & 0 \\ 0 & \frac{g_{R1x}}{g_{R1y}} & 0 \\ 0 & 0 & 1 \end{bmatrix} \quad (18)$$

$$G_{T1\_ratio} \stackrel{def}{=} \begin{bmatrix} 1 & 0 & 0 \\ 0 & gT1 & 0 \\ 0 & 0 & 1 \end{bmatrix} = \begin{bmatrix} 1 & 0 & 0 \\ 0 & \frac{g_{T1x}}{g_{T1y}} & 0 \\ 0 & 0 & 1 \end{bmatrix}$$

where $G_{R1\_ratio}$ represents the gain ratio matrix for receiver R1 and $G_{T1\_ratio}$ represents the gain ratio matrix for transmitter T1. Similar gain ratio matrices may be obtained for receiver R2 and transmitter T2.

Applying these gain ratios to the measured voltages (shown in Equation 14) enables the y transmitter and y receiver gains to be replaced by x transmitter and x receiver gains (e.g., at 126 in FIG. 3B). The voltage measurements may then be rotated mathematically (e.g., at 130 in FIG. 3B) to simulate rotation of the x and y antennas in the R1 and R2 receivers and the T2 transmitter such that they are rotationally aligned with the x and y antennas in the T1 transmitter. Such rotation removes the effect of the offset angle α and misalignment angle γ on the measurements. For example, the DC voltages measured between T1 and R1 may be back rotated by the measured alignment angle between T1 and R1 αm. The alignment angle may be measured using substantially any technique, for example, including a physical caliper measurement, and is referred to as αm to indicate that it is a measured value. This process may be represented mathematically, for example, as follows:

$$V_{DC\_11\_rot} \stackrel{def}{=} \quad (19)$$

$$G_{T1\_ratio} V_{DC\_11} G_{R1\_ratio} R_{\alpha m}^t = \begin{bmatrix} g_{T1x}g_{R1x}\frac{(Z_{11xx}+Z_{11yy})}{2} & g_{T1x}g_{R1x}\frac{(Z_{11xy}-Z_{11yx})}{2} & 0 \\ -g_{T1x}g_{R1x}\frac{(Z_{11xy}-Z_{11yx})}{2} & g_{T1x}g_{R1x}\frac{(Z_{11xx}+Z_{11yy})}{2} & 0 \\ 0 & 0 & g_{T1z}g_{R1z}Z_{11zz} \end{bmatrix}$$

where $V_{DC\_11\_rot}$ represent the rotated DC voltage coefficients. It will be understood that rotation about the z-axis does not change the value of the DC coefficient (see Equation 9) and that Equation 19 may be expressed identically as: $V_{DC\_11\_rot} \stackrel{def}{=} G_{T1\_ratio} V_{DC\_11} G_{R1\_ratio}$. Notwithstanding, in the description that follows, the DC coefficients are shown to be rotated to be consistent with the first harmonic and second harmonic coefficients.

The first harmonic cosine coefficients may be similarly rotated to obtain rotated first harmonic cosine coefficients, for example, as follows:

$$V_{FHC\_11\_rot} \stackrel{def}{=} G_{T1\_ratio} V_{FHC\_11} G_{R1\_ratio} R_{\alpha m}^t = \quad (20)$$

$$\begin{bmatrix} 0 & 0 & g_{T1x}g_{R1z}Z_{11xz} \\ 0 & 0 & g_{T1x}g_{R1z}Z_{11yz} \\ g_{T1z}g_{R1x}Z_{11zx} & g_{T1z}g_{R1x}Z_{11zy} & 0 \end{bmatrix}$$

where $V_{FHC\_11\_rot}$ represent the rotated first harmonic cosine voltage coefficients. The first harmonic cosine coefficients may be similarly rotated by αm plus an additional 90 degree back rotation to obtain rotated first harmonic sine coefficients, for example, as follows:

$$V_{FHS\_11\_rot} \stackrel{def}{=} R_{90} G_{T1\_ratio} V_{FHS\_11} G_{R1\_ratio} R_{\alpha m}^t R_{90}^t \quad (21)$$

$$= \begin{bmatrix} 0 & 0 & g_{T1x}g_{R1z}Z_{11xz} \\ 0 & 0 & g_{T1x}g_{R1z}Z_{11yz} \\ g_{T1z}g_{R1x}Z_{11zx} & g_{T1z}g_{R1x}Z_{11zy} & 0 \end{bmatrix}$$

where $V_{FHS\_11\_rot}$ represent the rotated first harmonic sine voltage coefficients. The second harmonic cosine coefficients may be rotated similarly to the first harmonic cosine coefficients to obtain rotated second harmonic cosine coefficients, for example, as follows:

$$V_{SHC\_11\_rot} \stackrel{def}{=} G_{T1\_ratio} V_{SHC\_11} G_{R1\_ratio} R_{\alpha m}^t \quad (22)$$

$$= \begin{bmatrix} g_{T1x}g_{R1x}\frac{(z_{11xx}-z_{11yy})}{2} & g_{T1x}g_{R1x}\frac{(z_{11xy}+z_{11yx})}{2} & 0 \\ g_{T1x}g_{R1x}\frac{(z_{11xy}+z_{11yx})}{2} & -g_{T1x}g_{R1x}\frac{(z_{11xx}-z_{11yy})}{2} & 0 \\ 0 & 0 & 0 \end{bmatrix}$$

where $V_{SHC\_11\_rot}$ represent the rotated second harmonic cosine voltage coefficients. The second harmonic cosine coefficients may be similarly rotated by αm plus an additional 45 degree back rotation to obtain rotated second harmonic sine coefficients, for example, as follows:

$$V_{SHS\_11\_rot} \stackrel{def}{=} R_{45} G_{T1\_ratio} V_{SHS\_11} G_{R1\_ratio} R_{\alpha m}^t R_{45}^t \quad (23)$$

$$= \begin{bmatrix} g_{T1x}g_{R1x}\frac{(z_{11xx}-z_{11yy})}{2} & g_{T1x}g_{R1x}\frac{(z_{11xy}+z_{11yx})}{2} & 0 \\ g_{T1x}g_{R1x}\frac{(z_{11xy}+z_{11yx})}{2} & -g_{T1x}g_{R1x}\frac{(z_{11xx}-z_{11yy})}{2} & 0 \\ 0 & 0 & 0 \end{bmatrix}$$

where $V_{SHS\_11\_rot}$ represent the rotated second harmonic sine voltage coefficients. The voltage measurements for other transmitter receiver combinations may also be similarly rotated. For example, the voltage measurements on receiver R2 obtained upon firing transmitter T1 may be back rotated by both αm and the measured alignment mismatch between the first and second subs γm (as though receiver R2 were back rotated with respect to transmitter T1 by αm and γm). The misalignment angle between the subs may be measured using substantially any technique. For example, the misalignment angle may be taken to be the difference between magnetic toolface angles measured at each of the subs, and is referred to as γm to indicate that it is a measured value. The T1-R2 voltage measurements may be given, for example, as follows:

$$V_{DC\_12\_rot} \stackrel{def}{=} G_{T1\_ratio} V_{DC\_12} G_{R2\_ratio} R^t_{\alpha m} R^t_{\gamma m} \quad (24)$$

$$V_{FHC\_12\_rot} \stackrel{def}{=} G_{T1\_ratio} V_{FHC\_12} G_{R2\_ratio} R^t_{\alpha m} R^t_{\gamma m}$$

$$V_{FHS\_12\_rot} \stackrel{def}{=} R_{90} G_{T1\_ratio} V_{FHS\_12} G_{R2\_ratio} R^t_{\alpha m} R^t_{90} R^t_{\gamma m}$$

$$V_{SHC\_12\_rot} \stackrel{def}{=} G_{T1\_ratio} V_{SHC\_12} G_{R2\_ratio} R^t_{\alpha m} R^t_{\gamma m}$$

$$V_{SHS\_12\_rot} \stackrel{def}{=} R_{45} G_{T1\_ratio} V_{SHS\_12} G_{R2\_ratio} R^t_{\alpha m} R^t_{45} R^t_{\gamma m}$$

The voltage measurements on receiver R1 obtained upon firing transmitter T2 may also be rotated (in this case as though receiver R1 were back rotated with respect to transmitter T1 by αm and transmitter T2 were back rotated with respect to transmitter T1 by γm).

$$V_{DC\_21\_rot} \stackrel{def}{=} R_{\gamma m} G_{T2\_ratio} V_{DC\_21} G_{R1\_ratio} R^t_{\alpha m} \quad (25)$$

$$V_{FHC\_21\_rot} \stackrel{def}{=} R_{\gamma m} G_{T2\_ratio} V_{FHC\_21} G_{R1\_ratio} R^t_{\alpha m}$$

$$V_{FHS\_21\_rot} \stackrel{def}{=} R_{\gamma m} R_{90} G_{T2\_ratio} V_{FHS\_21} G_{R1\_ratio} R^t_{\alpha m} R^t_{90}$$

$$V_{SHC\_21\_rot} \stackrel{def}{=} R_{\gamma m} G_{T2\_ratio} V_{SHC\_21} G_{R1\_ratio} R^t_{\alpha m}$$

$$V_{SHS\_21\_rot} \stackrel{def}{=} R_{\gamma m} R_{45} G_{T2\_ratio} V_{SHS\_21} G_{R1\_ratio} R^t_{\alpha m} R^t_{45}$$

The voltage measurements on receiver R2 obtained upon firing transmitter T2 may also be rotated (in this case as though receiver R2 were back rotated with respect to transmitter T1 by αm and γm and transmitter T2 were back rotated with respect to transmitter T1 by γm).

$$V_{DC\_22\_rot} \stackrel{def}{=} R_{\gamma m} G_{T2\_ratio} V_{DC\_22} G_{R2\_ratio} R^t_{\alpha m} R^t_{\gamma m} \quad (26)$$

$$V_{FHC\_22\_rot} \stackrel{def}{=} R_{\gamma m} G_{T2\_ratio} V_{FHC\_22} G_{R2\_ratio} R^t_{\alpha m} R^t_{\gamma m}$$

$$V_{FHS\_22\_rot} \stackrel{def}{=} R_{\gamma m} R_{90} G_{T2\_ratio} V_{FHS\_22} G_{R2\_ratio} R^t_{\alpha m} R^t_{90} R^t_{\gamma m}$$

$$V_{SHC\_22\_rot} \stackrel{def}{=} R_{\gamma m} G_{T2\_ratio} V_{SHC\_22} G_{R2\_ratio} R^t_{\alpha m} R^t_{\gamma m}$$

$$V_{SHS\_22\_rot} \stackrel{def}{=} R_{\gamma m} R_{45} G_{T2\_ratio} V_{SHS\_22} G_{R2\_ratio} R^t_{\alpha m} R^t_{45} R^t_{\gamma m}$$

The rotated voltage measurements presented in Equations 19-26 may be combined in various combinations to obtain a large number of compensated measurements (e.g., at 130 in FIG. 3A). Selected ones of these compensated measurements are presented below. For example, compensated quantities RCXX and RCYY equivalent to the xx and yy direct coupling impedances (also referred to herein as the xx and yy couplings) may be obtained as follows:

$$RCXX = \sqrt{\frac{(V_{DC\_12xx\_rot} + V_{SCH\_12xx\_rot})}{(V_{DC\_11xx\_rot} + V_{SCH\_11xx\_rot})} \cdot \frac{(V_{DC\_21xx\_rot} + V_{SCH\_21xx\_rot})}{(V_{DC\_22xx\_rot} + V_{SCH\_22xx\_rot})}} = \sqrt{\frac{z_{12xx} z_{21xx}}{z_{11xx} z_{11xx}}} \quad (27)$$

$$RCYY = \sqrt{\frac{(V_{DC\_12yy\_rot} + V_{SCH\_12yy\_rot})}{(V_{DC\_11yy\_rot} + V_{SCH\_11yy\_rot})} \cdot \frac{(V_{DC\_21yy\_rot} + V_{SCH\_21yy\_rot})}{(V_{DC\_22yy\_rot} + V_{SCH\_22yy\_rot})}} = \sqrt{\frac{z_{12yy} z_{21yy}}{z_{11yy} z_{11yy}}} \quad (28)$$

Compensated quantities RCXY and RCYX equivalent to the xy and yx cross coupling impedances (also referred to herein as the xy and yx couplings) may be obtained, for example, as follows:

$$RCXYij = \frac{V_{SHS\_ijxy\_rot} + V_{DC\_ijxy\_rot}}{2 \cdot V_{DC\_ijxx\_rot}} = \frac{z_{ijxy}}{(z_{ijxx} + z_{ijyy})} \quad (29)$$

$$RCYXij = \frac{V_{SHS\_ijxy\_rot} - V_{DC\_ijxy\_rot}}{2 \cdot V_{DC\_ijxx\_rot}} = \frac{z_{ijyx}}{(z_{ijxx} + z_{ijyy})} \quad (30)$$

Compensated quantities RCXZ and RCYZ which are related to the xz and zx cross coupling impedances and the yz and zy cross coupling impedances (also referred to herein as the xz, zx, yz, and zy couplings) may be obtained, for example, as follows:

$$RCXZij = \sqrt{\frac{V_{FHC\_ijzz\_rot} \cdot V_{FHC\_ijzx\_rot}}{V_{DC\_ijxx\_rot} \cdot V_{DC\_ijzz\_rot}}} = \sqrt{\frac{2 \cdot z_{ijxz} z_{ijzx}}{(z_{ijxx} + z_{ijyy}) z_{ijzx}}} \quad (31)$$

$$RCYZij = \quad (32)$$

$$\sqrt{\frac{V_{FHC\_ijyz\_rot} + V_{FHC\_ijzy\_rot}}{V_{DC\_ijyy\_rot} + V_{DC\_ijzz\_rot}}} = \sqrt{\frac{2 \cdot z_{ijxz} z_{ijzx}}{(z_{ijxx} + z_{ijyy}) z_{ijzx}}}$$

For each transmitter receiver combination the above described rotated voltage coefficients (Equations 19-26) may also be combined to improve signal to noise ratio (e.g., at 142 in FIG. 3B). For example, the following combinations may be obtained:

$$XXplusYY_{ij} \stackrel{def}{=} \frac{V_{DC_{ijxx\_rot}} + V_{DC_{ijyy\_rot}}}{2} = g_{Tix} g_{Rjx} \frac{(z_{ijxx} + z_{ijyy})}{2} \quad (33)$$

$$XYminusYX_{ij} \stackrel{def}{=} \frac{V_{DC_{ijxy\_rot}} + V_{DC_{ijyx\_rot}}}{2} = g_{Tix} g_{Rjx} \frac{(z_{ijxy} + z_{ijyx})}{2} \quad (34)$$

$$XXminusYY_{ij} \stackrel{def}{=} \frac{V_{SHC_{ijxx\_rot}} - V_{SHC_{ijyy\_rot}} +}{4} \quad (35)$$
$$\frac{V_{SHS_{ijxx\_rot}} - V_{SHS_{ijyy\_rot}}}{4} = g_{Tix} g_{Rjx} \frac{(z_{ijxx} - z_{ijyy})}{2}$$

$$XYplusYX_{ij} \stackrel{def}{=} \frac{V_{SHC_{ijxy\_rot}} + V_{SHC_{ijyx\_rot}} +}{4} \quad (36)$$
$$\frac{V_{SHS_{ijxy\_rot}} + V_{SHS_{ijyx\_rot}}}{4} = g_{Tix} g_{Rjx} \frac{(z_{ijxy} - z_{ijyx})}{2}$$

$$XZ_{ij} \stackrel{def}{=} \frac{V_{FHC_{ijxz\_rot}} + V_{FHS_{ijxz\_rot}}}{2} = g_{Tix} g_{Rjz} z_{ijxz} \quad (37)$$

$$YZ_{ij} \stackrel{def}{=} \frac{V_{FHC_{ijyz\_rot}} + V_{FHS_{ijyz\_rot}}}{2} = g_{Tix} g_{Rjz} z_{ijyz} \quad (38)$$

-continued $$ZX_{ij} \stackrel{def}{=} \frac{V_{FHC_{ijzx\_rot}} + V_{FHS_{ijzx\_rot}}}{2} = g_{Tiz}g_{Rjx}Z_{ijzx} \quad (39)$$

$$ZY_{ij} \stackrel{def}{=} \frac{V_{FHC_{ijzy\_rot}} + V_{FHS_{ijzy\_rot}}}{2} = g_{Tiz}g_{Rjx}Z_{ijzy} \quad (40)$$

The measurement equivalent to the zz coupling does not required rotation and may be expressed, for example, as follows:

$$ZZ_{ij} \stackrel{def}{=} V_{DC_{ijzz}} = g_{Tiz}g_{Rjz}Z_{ijzz} \quad (41)$$

The combined measurements in Equations 33 through 41 may be further combined to fully compensate the transmitter and receiver gains (e.g., at 144 in FIG. 3B). A compensated measurement equivalent to the sum of the xx and yy couplings may be given, for example, as follows:

$$CXXplusYY = \quad (42)$$

$$\sqrt{\frac{XXplusYY_{12}XXplusYY_{21}}{XXplusYY_{11}XXplusYY_{22}}} = \sqrt{\frac{(z_{12xx}+z_{12yy})(z_{21xx}+z_{21yy})}{(z_{11xx}+z_{12yy})(z_{21xx}+z_{21yy})}}$$

where CXXplusYY represents a compensated measurement equivalent to the xx+yy coupling and $XXplusYY_{ij}$ is defined in Equation 33. A phase shift and attenuation for this quantity may be computed, for example, as follows:

$$XXplusYY\_CPS = \frac{180}{\pi}\text{angle}(CXXplusYY) \quad (43)$$

$$XXplusYY\_CAD = 20\log10(CXXplusYY)$$

where XXplusYY_CPS and XXplusYY_CAD represent the compensated phase shift and attenuation of the xx+yy coupling.

Compensated measurements equivalent to the xx and/or yy couplings may be constructed by combining the xx+yy measurements with the xx−yy measurements, for example, as follows:

$$CXX = \sqrt{\frac{(XXplusYY_{12}+XXminusYY_{12})}{(XXplusYY_{21}+XXminusYY_{21})}} = \sqrt{\frac{z_{12xx}z_{21xx}}{z_{11xx}z_{22xx}}} \quad (44)$$

$$CYY = \sqrt{\frac{(XXplusYY_{12}-XXminusYY_{12})}{(XXplusYY_{21}-XXminusYY_{21})}} = \sqrt{\frac{z_{12yy}z_{21yy}}{z_{11yy}z_{22yy}}} \quad (45)$$

where CXX and CYY represent compensated measurements equivalent to the xx and yy couplings and $XXplusYY_{ij}$ and $XXminusYY_{ij}$ are defined in Equations 33 and 35. Phase shift and attenuation for these quantities may be computed as described above with respect to Equation 43.

Compensated measurements sensitive to a sum of the xy and yx couplings may be computed in a similar manner using the second harmonic cosine and the DC coefficients, for example, as follows:

$$CXYplusYX = \quad (46)$$

$$\sqrt{\frac{XYplusYX_{12}XYplusYX_{21}}{XXplusYY_{11}XXplusYY_{22}}} = \sqrt{\frac{(z_{12xy}+z_{12yx})(z_{21xy}+z_{21yx})}{(z_{11xx}+z_{11yy})(z_{22xx}+z_{22yy})}}$$

where CXYplusYX represents the compensated measurement and $XYplusYX_{ij}$ is defined in Equation 36. A compensated measurement sensitive to a difference between the xy and yx couplings may similarly be computed.

$$CXYminusYX = \quad (47)$$

$$\sqrt{\frac{XYminusYX_{12}XYminusYX_{21}}{XXplusYY_{11}XXplusYY_{22}}} = \sqrt{\frac{(Z_{12xy}-Z_{12yx})(Z_{21xy}-Z_{21yx})}{(Z_{11xx}+Z_{11yy})(Z_{22xx}+Z_{22yy})}}$$

where CXYminusYX represents the compensated measurement and $XXplusYY_{ij}$ and $XYminusYX_{ij}$ are defined in Equations 33 and 34. A compensated measurement sensitive to a difference between the xx and yy couplings may further be computed:

$$CXXminusYY = \quad (48)$$

$$\sqrt{\frac{XXminusYY_{12}XXminusYY_{21}}{XXplusYY_{11}XXplusYY_{22}}} = \sqrt{\frac{(Z_{12xx}-Z_{12yy})(Z_{21xx}-Z_{21yy})}{(Z_{11xx}+Z_{11yy})(Z_{22xx}+Z_{22yy})}}$$

where CXXminusYY represents the compensated quantity and $XXplusYY_{11}$ and $XXminusYY_{12}$ are defined in Equations 33 and 35.

Since the quantities in Equations 46, 47, and 48 may be equal to zero in simple formations, the phase shift and attenuation may be computed by adding one to the compensated quantity, for example, as follows:

$$XYplusYX\_CPS = \frac{180}{\pi}\text{angle}(1+CXYplusYX) \quad (49)$$

$$XYplusYX\_CAD = 20\log10(1+CXYplusYX)$$

$$XXminusYY\_CPS = \frac{180}{\pi}\text{angle}(1+CXXminusYY) \quad (50)$$

$$XXminusYY\_CAD = 20\log10(1+CXXminusYY)$$

$$XYminusYX\_CPS = \frac{180}{\pi}\text{angle}(1+CXYminusYX) \quad (51)$$

$$XYminusYX\_CAD = 20\log10(1+CXYminusYX)$$

where CPS quantities represent a compensated phase shift and CAD quantities represent a compensated attenuation.

Other compensated combinations of the couplings may be computed from the ratios of the second harmonic to DC coefficients. These couplings are similar to those described above, but yield compensated measurements at different depths of investigation (i.e., using a single transmitter and a single receiver). For example, $$CXXminusYYij = \frac{XXminusYY_{ij}}{XXplusYY_{ij}} = \frac{(Z_{ijxx}-Z_{ijyy})}{(Z_{ijxx}+Z_{ijyy})} \quad (52)$$

$$CXYplusYXij = \frac{XYplusYX_{ij}}{XXplusYY_{ij}} = \frac{(Z_{ijxy}+Z_{ijyx})}{(Z_{ijxx}+Z_{ijyy})} \quad (53)$$

-continued $$CXYminusYXij = \frac{XYminusYXij}{XXplusYY_{ij}} = \frac{(Z_{ijxy} - Z_{ijyx})}{(Z_{ijxx} + Z_{ijyy})} \quad (54)$$

where CXXminusYYij, CXYplusYXij, and CXYminusYXij represent the compensated measurements at any transmitter i receiver j combination and $XXplusYY_{ij}$, XYminusYXij, XXminusYY$_{ij}$, and XYplusYXij are defined in Equations 33 through 36. Additionally, compensated combinations may be computed from the second harmonic coefficients that are sensitive to either the xy or yx couplings For example, $$CXYij = \frac{XYplusYXij + XYminusYXij}{XXplusYYij} = \frac{2Z_{ijxy}}{(Z_{ijxx} + Z_{ijyy})} \quad (55)$$

$$CYXij = \frac{XYplusYXijxx - XYminusYXij}{XXplusYYij} = \frac{2Z_{ijyx}}{(Z_{ijxx} + Z_{ijyy})} \quad (56)$$

where CXYij and CYXij represent the compensated measurements at any transmitter i receiver j combination and $XXplusYY_{ij}$, XYminusYXij, and XYplusYXij are defined in Equations 33, 34, and 36. Phase shift and attenuation for the quantities shown in Equations 52 through 56 may be computed as described above with respect to Equations 49-51.

Equations 42 through 56 disclose compensated measurements sensitive to one or more of the xx and yy couplings and the xy and yx couplings. The zz coupling may be compensated, for example, as follows:

$$CZZ = \sqrt{\frac{ZZ_{12}ZZ_{21}}{ZZ_{11}ZZ_{22}}} = \sqrt{\frac{Z_{12zz}Z_{21zz}}{Z_{11zz}Z_{22zz}}} \quad (57)$$

where CZZ represents the compensated measurement and $ZZ_{ij}$ are defined in Equation 41.

Gain compensated quantities sensitive to the xz, zx, yz, and zy couplings may be computed, for example, as follows:

$$CXZZXij = \sqrt{\frac{ZX_{ij}}{ZZ_{ij}} \frac{XZ_{ij}}{XXplusYY_{ij}}} = \sqrt{\frac{2 \cdot Z_{ijzx}Z_{ijxz}}{Z_{ijzz}(Z_{ijxx} + Z_{ijyy})}} \quad (58)$$

$$CYZZYij = \sqrt{\frac{ZY_{ij}}{ZZ_{ij}} \frac{YZ_{ij}}{XXplusYY_{ij}}} = \sqrt{\frac{2 \cdot Z_{ijzy}Z_{ijyz}}{Z_{ijzz}(Z_{ijxx} + Z_{ijyy})}} \quad (59)$$

where CXZZXij represents a compensated quantity sensitive to the product of xz and zx impedances, CYZZYij represents a compensated quantity sensitive to the product of yz and zy impedances, and $XXplusYY_{ij}$, $XZ_{ij}$, $YZ_{ij}$, $ZX_{ij}$, and $ZZ_{ij}$ are defined in Equations 33 and 37 through 41. It will be understood that CXZZXij and CYZZYij may be used to provide compensated measurements at different depths of investigation (e.g., at shallow depths for T1-R1 and T2-R2 combinations and larger depths for T1-R2 and T2-R1 combinations).

Equations 33 and 37 through 41 may also be used to provide compensated quantities that have properties similar to the symmetrized and anti-symmetrized quantities disclosed in U.S. Pat. Nos. 6,969,994 and 7,536,261 which are fully incorporated by reference herein. For example, the following compensated ratios may be computed.

$$R_{zx} \stackrel{def}{=} \frac{ZX_{12}}{ZZ_{11}} \frac{XZ_{21}}{XXplusYY_{22}} \quad (60)$$

$$R_{xz} \stackrel{def}{=} \frac{XZ_{12}}{XXplusYY_{11}} \frac{ZX_{21}}{ZZ_{22}}$$

$$R1_{xz\_zx} \stackrel{def}{=} \frac{ZX_{12}}{ZZ_{12}} \frac{XZ_{12}}{XXplusYY_{12}}$$

$$R2_{xz\_zx} \stackrel{def}{=} \frac{ZX_{21}}{ZZ_{21}} \frac{XZ_{21}}{XXplusYY_{21}}$$

In Equation 60, $R_{zx}$ and $R_{xz}$ represent compensated quantities that are proportional to the square of the zx and xz couplings. Hence, compensated measurements proportional to the zx and xz couplings may be obtained, for example, as follows: $CZX=\sqrt{R_{zx}}$ and $CXZ=\sqrt{R_{xz}}$. Gain compensated measurements sensitive to the zy and yz couplings may be obtained similarly (i.e., by computing $R_{zy}$ and $R_{yz}$).

The compensated symmetrized and anti-symmetrized measurements may then be defined, for example, as follows:

$$Ac \stackrel{def}{=} 2\sqrt{R_{zx} + R_{xz} + \text{scale}(R1_{xz\_zx} + R2_{xz\_zx})} \quad (61)$$

$$Sc \stackrel{def}{=} 2\sqrt{R_{zx} + R_{xz} - \text{scale}(R1_{xz\_zx} + R2_{xz\_zx})}$$

where $$\text{scale} \stackrel{def}{=} CZZ \cdot CXX$$

and $R_{zx}$, $R_{xz}$, $R1_{xz\_zx}$, and $R2_{xz\_zx}$ are defined in Equation 60. As described above with respect to Equation 17, taking the square root of a quantity can introduce a sign (or phase) ambiguity. Even with careful unwrapping of the phase in Equation 61, a symmetrized directional measurement Sc may have the same sign whether an approaching bed is above or below the measurement tool. The correct sign may be selected, for example, via selecting the sign of the phase angle and/or attenuation of the following relation:

$$TSD = \sqrt{R_{zx}} - \sqrt{R_{xz}} \quad (62)$$

Similarly the anti-symmetrized directional measurement Ac in Equation 61 has the same sign whether the dip azimuth of the anisotropy is less than 180 degrees or greater than 180 degrees. This sign ambiguity may be resolved, for example, by taking the sign of the phase angle and/or attenuation of the following relation.

$$TAD = \sqrt{R_{zx}} + \sqrt{R_{xz}} \quad (63)$$

The symmetrized and anti-symmetrized measurements may now be re-defined, for example, as follows to eliminate the sign ambiguity.

$$Sc \stackrel{def}{=} 2\text{sign}(\text{angle}(TSD))\sqrt{R_{zx} + R_{xz} - \text{scale}(R1_{xz\_zx} + R2_{xz\_zx})} \quad (64)$$

$$Ac \stackrel{def}{=} 2\text{sign}(\text{angle}(TAD))\sqrt{R_{zx} + R_{xz} + \text{scale}(R1_{xz\_zx} + R2_{xz\_zx})}$$

Symmetrized directional phase shift and attenuation measurements TDSP and TDSA may be defined, for example, as follows:

$$TDSP \stackrel{def}{=} \frac{180}{\pi} \text{angle}(1 + Sc) \quad (65)$$

$$TDSA \stackrel{def}{=} 20\log 10(1 + Sc)$$

Likewise, anti-symmetrized directional phase shift and attenuation TDAP and TDAA measurements may also be defined, for example, as follows:

$$TDAP \stackrel{def}{=} \frac{180}{\pi} \text{angle}(1 + Ac) \quad (66)$$

$$TDAA \stackrel{def}{=} 20\log 10(1 + Ac)$$

The symmetrized and anti-symmetrized phase shift and attenuation given in Equations 65 and 66 may alternatively and/or additionally be modified to scale the phase shifts and attenuations. For example, for a deep reading array having a large spreading loss the phase shifts in particular tend to be small. These values can be scaled by the spreading loss to scale them to values similar to those computed for a conventional shallow array, for example, as follows:

$$TDSP \stackrel{def}{=} \frac{180}{\pi} \text{angle}\left(1 + \frac{Sc}{SL}\right) \quad (67)$$

$$TDSA \stackrel{def}{=} 20\log 10\left(1 + \frac{Sc}{SL}\right) \text{ and}$$

$$TDAP \stackrel{def}{=} \frac{180}{\pi} \text{angle1}\left(1 + \frac{Ac}{SL}\right) \quad (68)$$

$$TDAA \stackrel{def}{=} 20\log 10\left(1 + \frac{Ac}{SL}\right)$$

where SL represents the spreading loss which is proportional to the cube of the ratio of the distance from the transmitter to the near receiver to the distance from the transmitter to the far receiver.

The quantities TSD and TAD computed in Equations 62 and 63 may alternatively be used to compute symmetrized and anti-symmetrized phase shift and attenuation, for example, as follows:

$$TDSP \stackrel{def}{=} \frac{180}{\pi} \text{angle}(1 + TSD) \quad (69)$$

$$TDSA \stackrel{def}{=} 20\log 10(1 + TSD) \text{ and}$$

$$TDAP \stackrel{def}{=} \frac{180}{\pi} \text{angle}(1 + TAD) \quad (70)$$

$$TDAA \stackrel{def}{=} 20\log 10(1 + TAD)$$

Moreover, the quantities computed in Equations 58, 59, and 60 may also be used to compute phase shift and attenuation values using the methodology in Equations 69 and 70.

The disclosed embodiments are now described in further detail with respect to the following non-limiting examples in FIGS. 4A, 4B, 5A, 5B, 6, 7A, 7B, 8A, and 8B. These examples are analytical (mathematical) and were computed using software code developed based on a point dipole model.

In the examples that follow (in FIGS. 4A though 5B), a tool model configuration similar to that shown on FIG. 2B was used in which receivers R1 and R2, and transmitter T2 were located 7, 63, and 70 feet above transmitter T1. A two-layer formation model was used in which the upper bed had a horizontal resistivity of 2 ohm·m and a vertical resistivity of 4 ohm·m and the lower bed had zero conductivity (i.e., infinite resistivity). Zero depth was defined as the depth at which the transmitter T1 crossed the bed boundary.

Figure 4A:
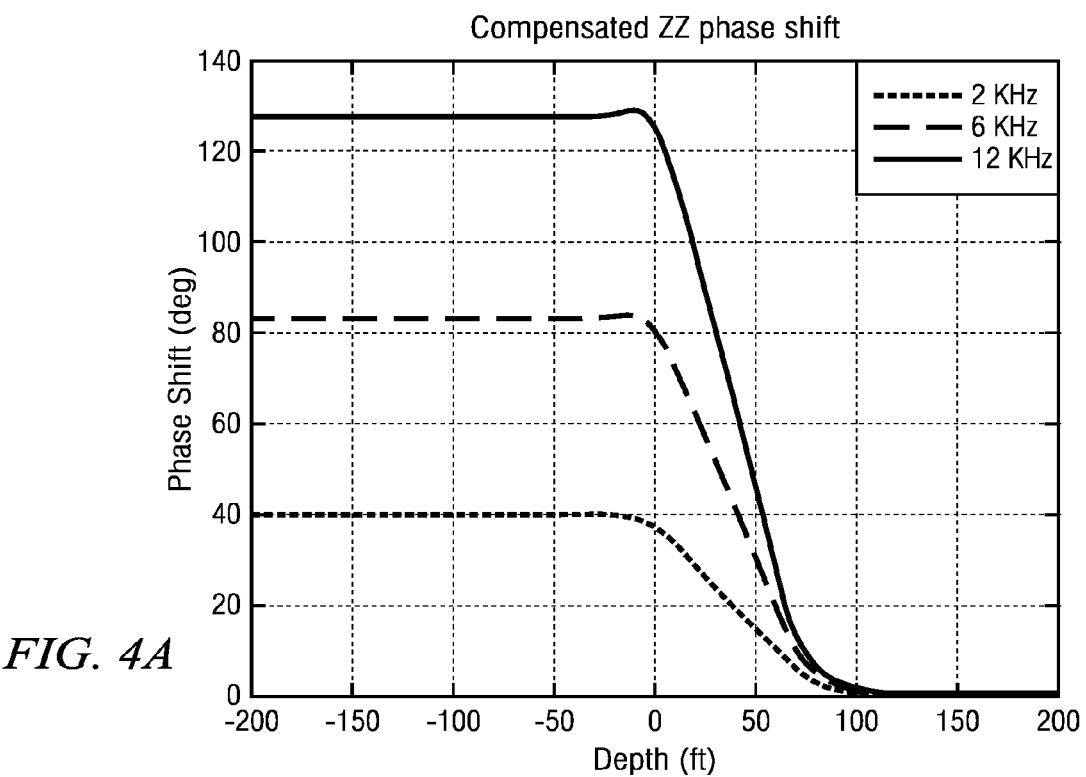
FIGS. 4A and 4B depict phase shift and attenuation versus depth for a compensated zz measurement at frequencies of 2, 6, and 12 kHz.
Figure 4B:
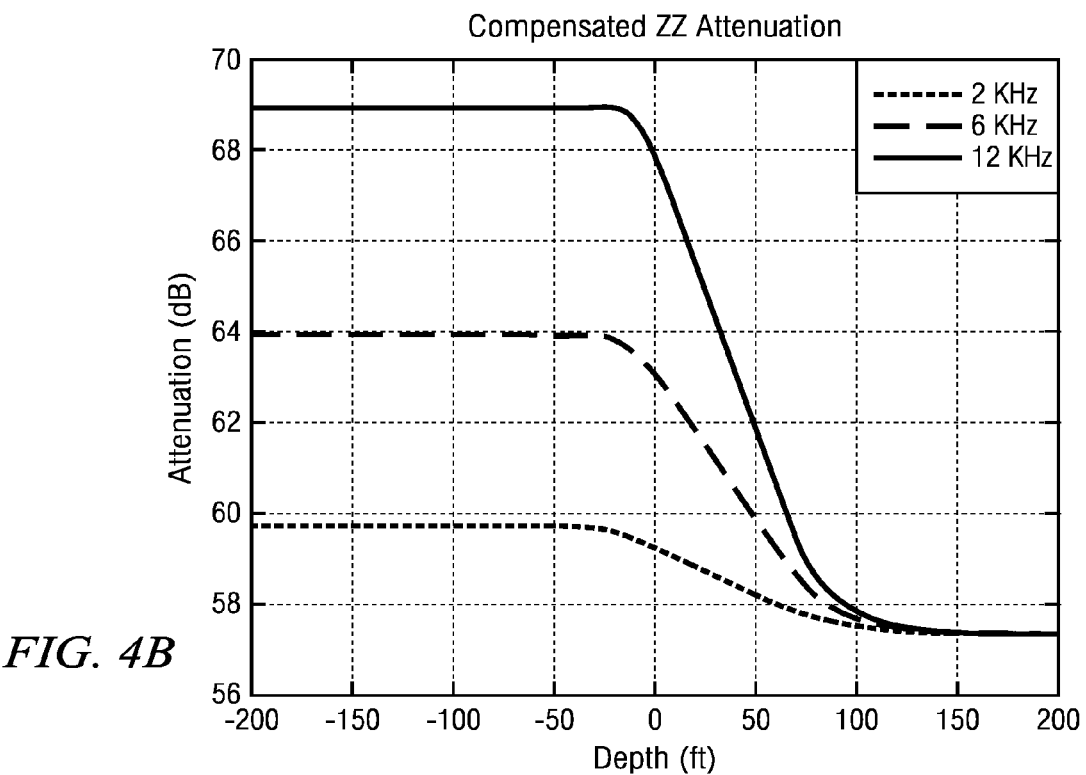

FIGS. 4A and 4B depict phase shift and attenuation versus depth for a compensated zz measurement (from Equation 57) at frequencies of 2, 6, and 12 kHz for the above described model. The computed phase shifts (FIG. 4A) depended on the measurement frequency and were constant with depth above the bed boundary (in the first layer) and decreased to zero below the bed boundary. The computed phase shift values were zero at depths greater than about 100 feet. The computed attenuations (FIG. 4B) also depended on the measurement frequency and were constant with depth above the bed boundary (in the first layer) and decreased to about 57.5 dB below the bed boundary. The computed phase shift values were independent of depth at depths greater than about 100 feet.

Figure 5A:
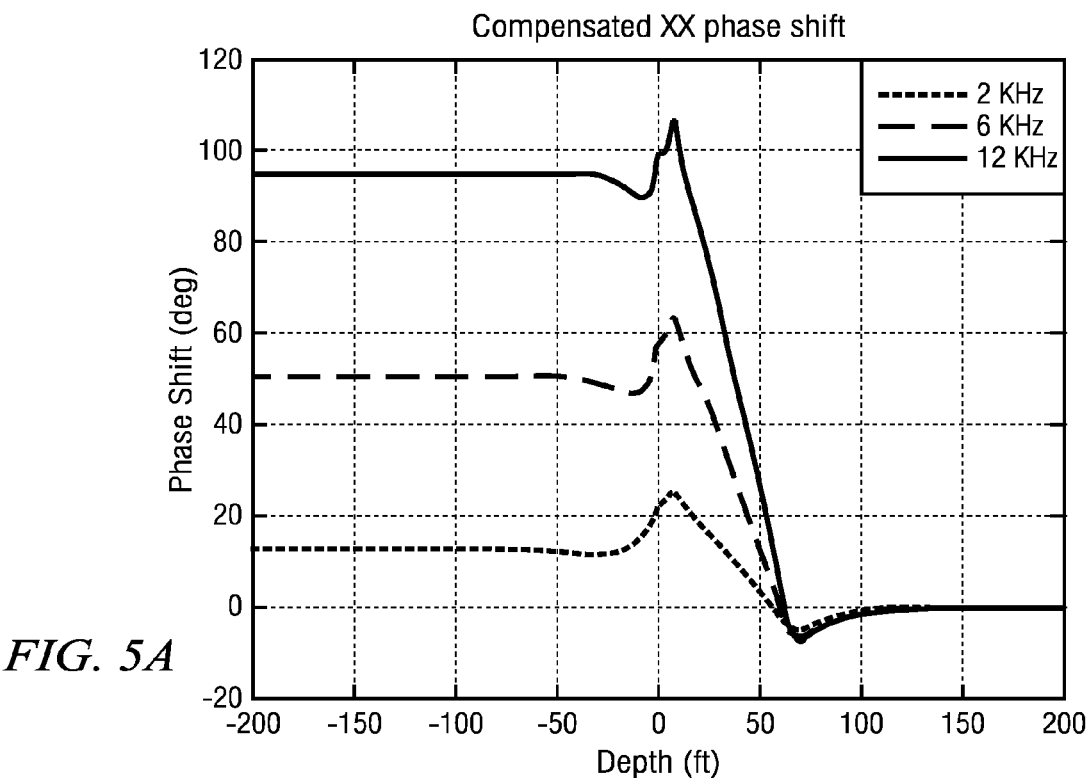
FIGS. 5A and 5B depict phase shift and attenuation versus depth for a compensated xx measurement at frequencies of 2, 6, and 12 kHz.
Figure 5B:
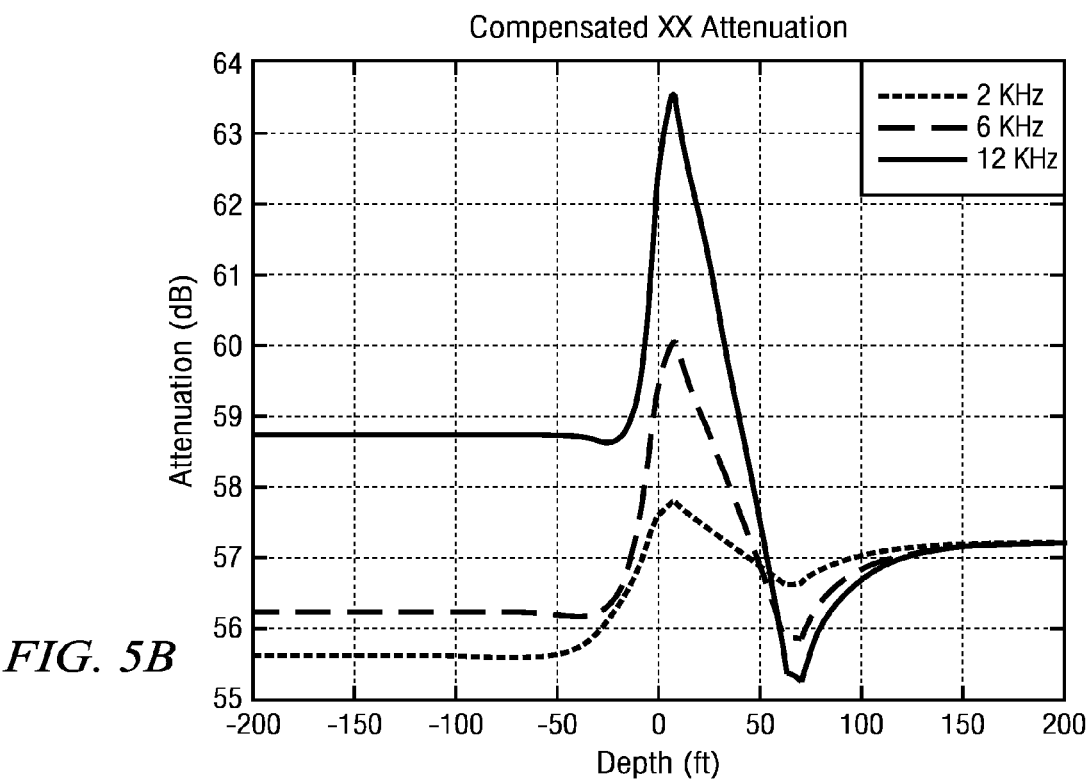

FIGS. 5A and 5B depict phase shift and attenuation versus depth for a compensated xx measurement (from Equation 44) at frequencies of 2, 6, and 12 kHz. The computed phase shifts (FIG. 5A) depended on the measurement frequency and were constant with depth down to about 50 feet above the bed boundary. The computed phase shift values were zero at depths greater than about 100 feet (below the boundary). Upon approaching the boundary (from above), the phase shift values underwent a perturbation in which they first decreased, increased sharply to a maximum just below the boundary, decreased to a minimum about 70 feet below the boundary before rising modestly to zero degrees. The computed attenuations (FIG. 4B) also depended on the measurement frequency and were constant with depth down to about 50 feet above the bed boundary. The attenuation was constant and independent of frequency at depths above about 100 feet. Upon approaching the boundary (from above), the phase shift values underwent a perturbation in which they first increased sharply to a maximum just below the boundary, decreased sharply to a minimum at about 70 feet below the boundary before rising to just over 57 dB.

Figure 6:
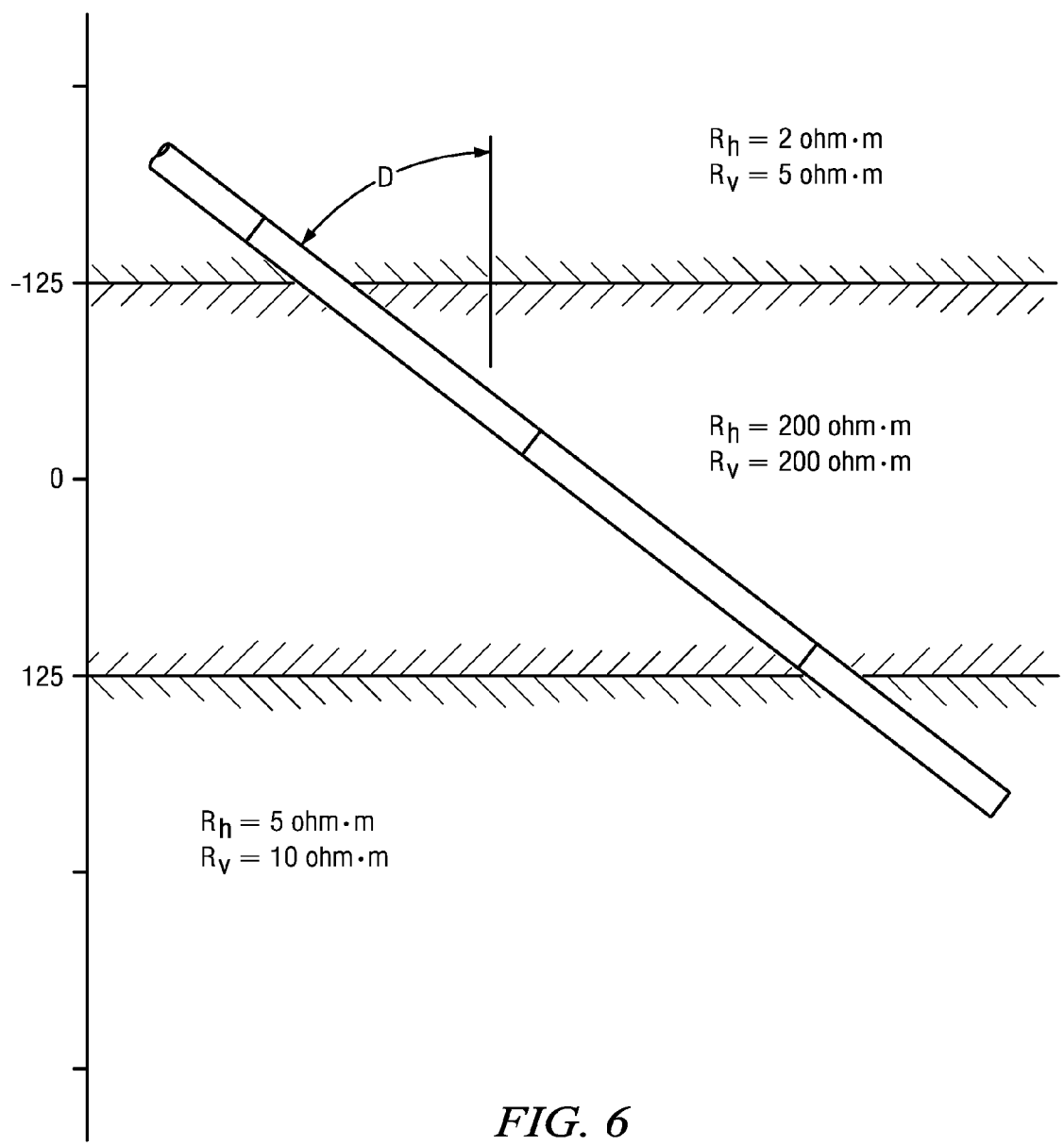
FIG. 6 depicts a three layer formation model used to evaluate the directional response of disclosed symmetrized and anti-symmetrized measurements.
Figure 7A:
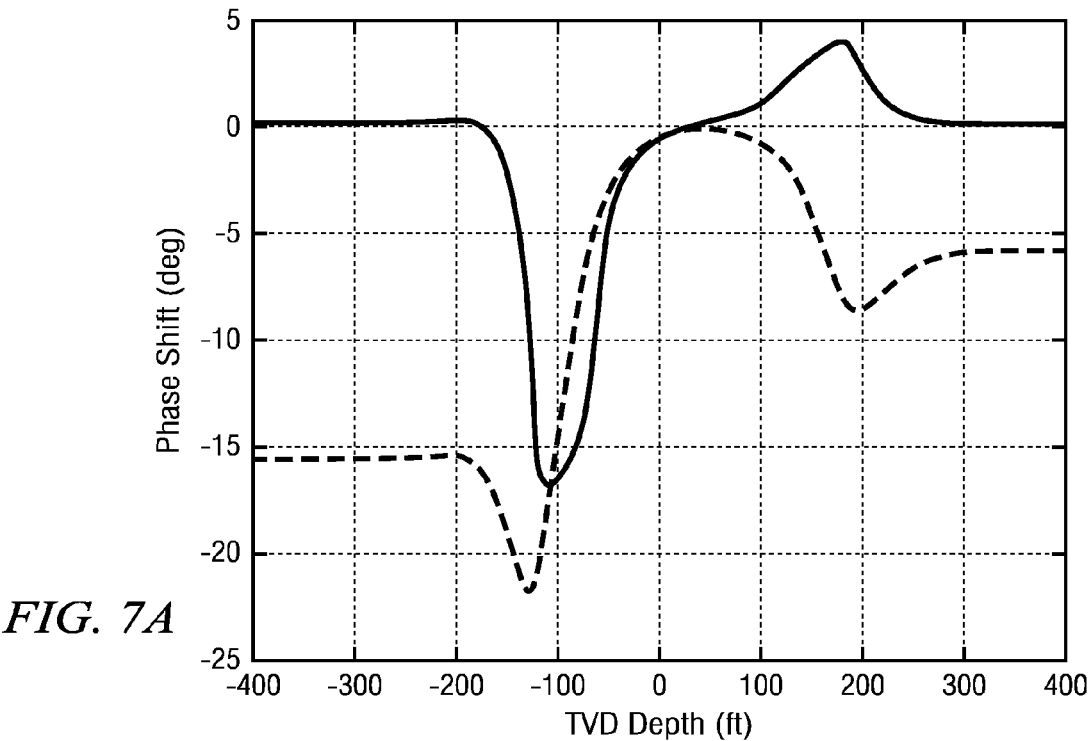
FIGS. 7A and 7B depict symmetrized and anti-symmetrized phase shift and attenuation versus total vertical depth at 30 degrees relative dip.
Figure 7B:
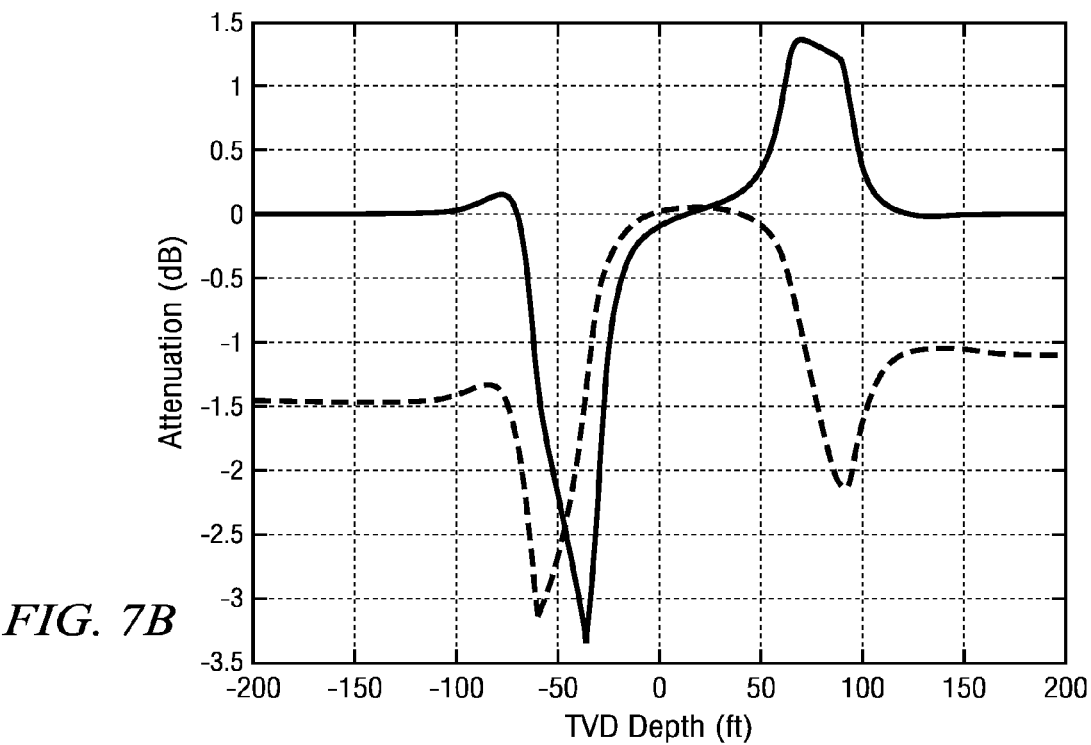
Figure 8A:
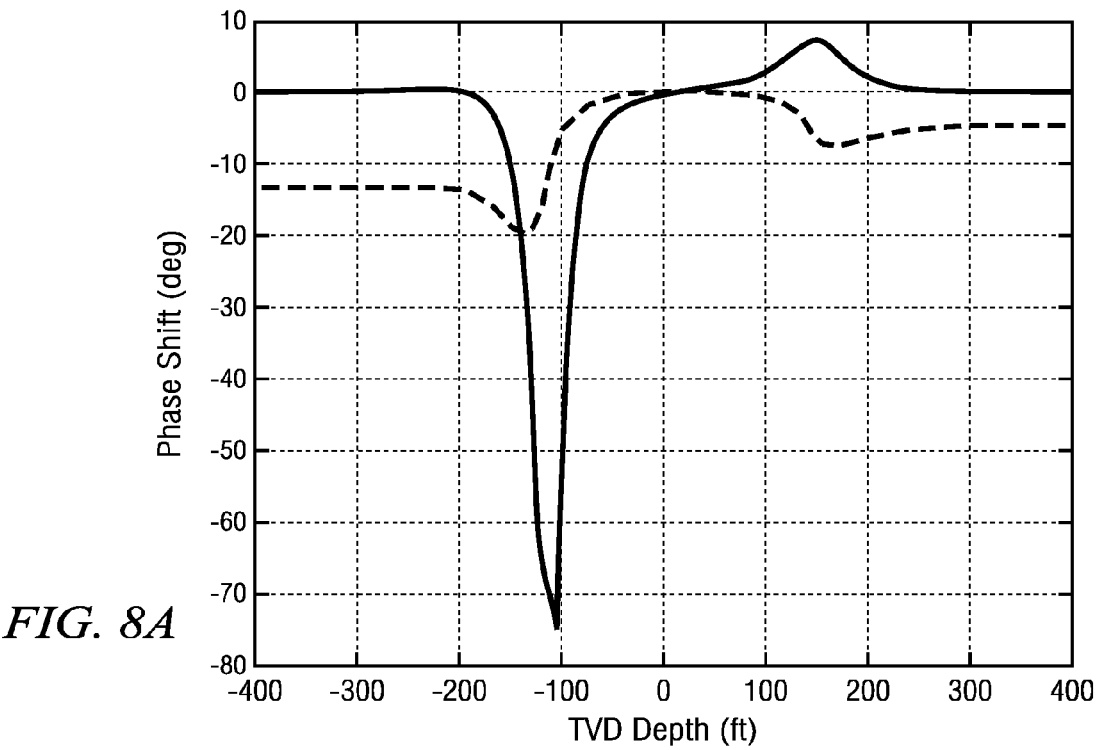
FIGS. 8A and 8B depict symmetrized and anti-symmetrized phase shift and attenuation versus total vertical depth at 70 degrees relative dip.
Figure 8B:
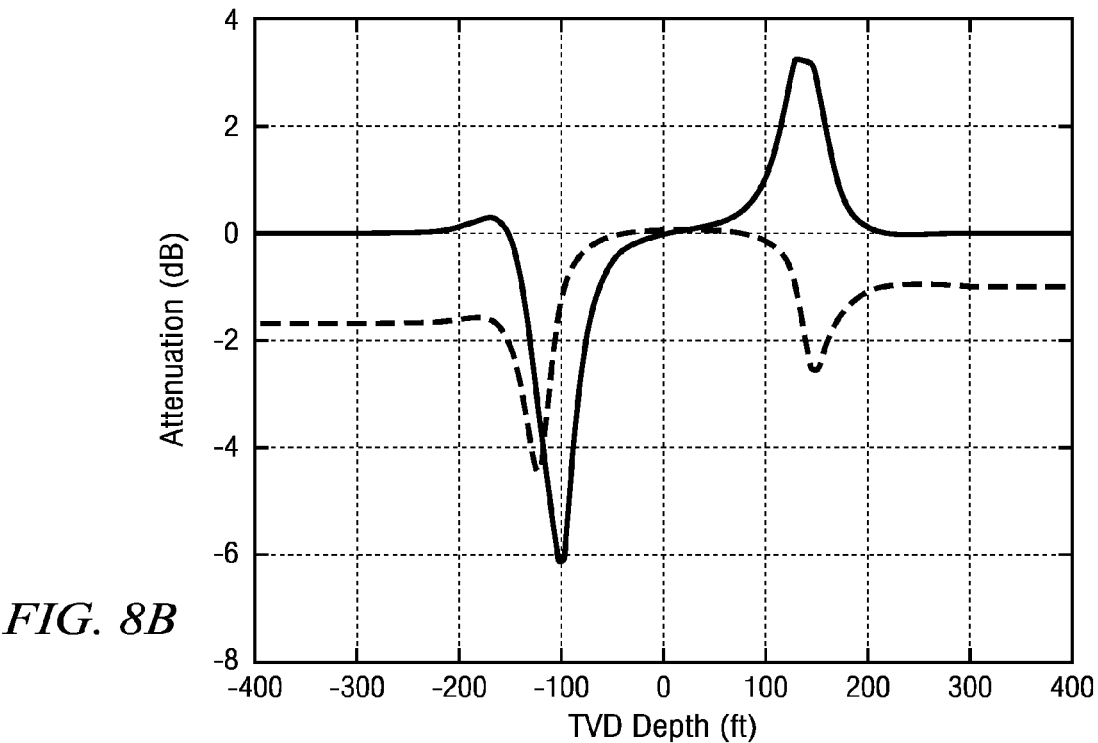

FIG. 6 depicts a three layer formation model used to evaluate the directional response of the compensated symmetrized and anti-symmetrized measurements shown in Equation 58. The upper layer has a horizontal resistivity of 2 ohm·m and a vertical resistivity of 5 ohm·m. The middle layer has a horizontal and vertical resistivities of 200 ohm·m while the lower layer has a horizontal resistivity of 5 ohm·m and a vertical resistivity of 10 ohm·m. The upper and lower boundaries of the middle layer were at −125 and 125 feet, respectively. The electromagnetic tool was inclined at a non-zero dip angle D. In the examples that follow (in FIGS. 7A though 8B), a tool model configuration similar to that shown on FIG. 2B was used in which receivers R1 and R2, and transmitter T2 were located 7, 63, and 70 feet above transmitter T1. Zero depth here was defined as the depth at which the mid-point between the receivers crossed the midpoint of the middle layer.

FIGS. 7A-8B depict symmetrized (solid) and anti-symmetrized (dashed) phase shift and attenuation versus total vertical depth at 30 degrees (FIGS. 7A and 7B) and 70 degrees (FIGS. 8A and 8B) relative dip. The symmetrized phase shift and attenuation are zero away from the bed boundary. Near the boundaries the symmetrized measurement shows a strong response that is independent of anisotropy and whose sign depends on whether the bed is being approached from above or below. The anti-symmetrized phase shift and attenuation respond to dip and anisotropy away from the bed boundary. The anti-symmetrized measurement response to a boundary is suppressed compared to the symmetrized.

It will be understood that the various methods disclosed herein for obtaining fully gain compensated electromagnetic measurement quantities may be implemented on a on a downhole processor. By downhole processor it is meant an electronic processor (e.g., a microprocessor or digital controller) deployed in the drill string (e.g., in the electromagnetic logging tool or elsewhere in the BHA). In such embodiments, the fully compensated measurement quantities may be stored in downhole memory and/or transmitted to the surface while drilling via known telemetry techniques (e.g., mud pulse telemetry or wired drill pipe). Alternatively, the harmonic fitting coefficients may transmitted uphole and the compensated quantities may be computed at the surface using a surface processor. Whether transmitted to the surface or computed at the surface, the quantity may be utilized in an inversion process (along with a formation model) to obtain various formation parameters as described above.

Although compensated tri-axial propagation measurements have been described in detail, it should be understood that various changes, substitutions and alternations can be made herein without departing from the spirit and scope of the disclosure as defined by the appended claims.

What is claimed is:

1. A method for making downhole electromagnetic logging while drilling measurements, the method comprising
    (a) rotating an electromagnetic logging while drilling tool in a subterranean wellbore, the logging tool including first and second transmitters and first and second receivers axially spaced apart from one another, each of the first and second transmitters and first and second receivers including an axial antenna and collocated first and second transverse antennas, the first and second transverse antennas in the first receiver being rotationally offset by a predefined angle from the first and second transverse antennas in the first transmitter;
    (b) acquiring a plurality of electromagnetic voltage measurements from the first and second receivers while rotating in (a);
    (c) processing the voltage measurements acquired in (b) to compute harmonic coefficients;
    (d) mathematically rotating the harmonic coefficients through at least the predefined angle to obtain rotated coefficients; and
    (e) processing ratios of selected ones of the rotated coefficients to compute gain compensated measurement quantities.

2. The method of claim 1, wherein the processing in (e) is performed by a downhole processor.

3. The method of claim 2, further comprising:
    (f) transmitting the gain compensated measurement quantities to a surface location; and
    (g) causing a surface computer to invert the gain compensated measurement quantities to obtain one or more properties of a subterranean formation.

4. The method of claim 1, further comprising:
    (f) processing the gain compensated measurement quantities to compute compensated phase shift and attenuation quantities.

5. The method of claim 1, wherein:
    the first and second transverse antennas in the second receiver are rotationally offset by the predefined angle from the first and second transverse antennas in the second transmitter; and
    the first and second transverse antennas in the second transmitter are rotationally offset by an arbitrary angle from the first and second transverse antennas in the first transmitter.

6. The method of claim 1, wherein the electromagnetic voltage measurements acquired in (b) comprise a three-dimensional matrix of voltage measurements.

7. The method of claim 1, wherein the harmonic coefficients computed in (c) comprise DC, first harmonic sine, first harmonic cosine, second harmonic sine, and second harmonic cosine coefficients.

8. The method of claim 1, wherein the gain compensated measurement quantities computed in (e) comprise at least one measurement proportional to an xx coupling, a yy coupling, an xx coupling plus a yy coupling, or an xx coupling minus a yy coupling.

9. The method of claim 1, wherein the gain compensated measurement quantities computed in (e) comprise at least one measurement proportional to an xy coupling, a yx coupling, an xy coupling minus a yx coupling, or an xy coupling plus a yx coupling.

10. The method of claim 1, wherein the gain compensated measurement quantities computed in (e) comprise at least one measurement proportional to a zx coupling, an xz coupling, a zy coupling, or a yz coupling.

11. The method of claim 1, wherein the gain compensated measurement quantities computed in (e) comprise at least one measurement sensitive to a product of an xz coupling and a zx coupling or a product of a yz coupling and a zy coupling.

12. The method of claim 1, wherein the gain compensated measurement quantities computed in (e) comprise (i) at least one measurement proportional to an xx coupling or a yy coupling, (ii) at least one measurement proportional to an xy coupling or yx coupling, (iii) at least one measurement proportional to a zx coupling, an xz coupling, a zy coupling, or a yz coupling, and (iv) a measurement proportional to an zz coupling.

13. The method of claim 1, further comprising:
    (f) processing the compensated measurement quantities computed in (e) to compute compensated symmetrized and anti-symmetrized measurement quantities.

14. The method of claim 1, wherein (c) further comprises: (i) processing the voltage measurements acquired in (b) to compute harmonic coefficients, and (ii) processing selected ones of the harmonic coefficients computed in (i) to obtain transmitter and receiver gain ratio matrices, and (iii) applying the gain ratio matrices to the harmonic coefficients.

15. The method of claim 1, wherein (e) further comprises: (i) processing combinations of the rotated coefficients to obtain rotated combinations and (ii) processing ratios of selected ones of the rotated combinations to obtain the gain compensated measurement quantities.

16. A method for making downhole electromagnetic logging while drilling measurements, the method comprising
    (a) rotating an electromagnetic logging while drilling tool in a subterranean wellbore, the logging tool including first and second transmitters and first and second receivers axially spaced apart from one another, each of the first and second transmitters and first and second receivers including an axial antenna and collocated first and second transverse antennas, the first and second transverse antennas in the first receiver being rotationally offset by a predefined angle from the first and second transverse antennas in the first transmitter; and (b) acquiring a plurality of electromagnetic voltage measurements from the first and second receivers while rotating in (a);

(c) processing the voltage measurements acquired in (b) to compute harmonic coefficients;

(d) processing selected ones of the harmonic coefficients computed in (c) to obtain transmitter and receiver gain matrices;

(e) applying the gain matrices to the harmonic coefficients;

(f) mathematically rotating the harmonic coefficients through at least the predefined angle to obtain rotated coefficients;

(g) processing combinations of the rotated coefficients to obtain rotated combinations; and (h) processing ratios of selected ones of the rotated combinations to obtain gain compensated measurement quantities.

17. The method of claim 16, wherein the processing in (e) is performed by a downhole processor and the method further comprises:
(i) transmitting the gain compensated measurement quantities to a surface location; and
(j) causing a surface computer to invert the gain compensated measurement quantities to obtain one or more properties of a subterranean formation.

18. The method of claim 16, further comprising:
(i) processing the gain compensated measurement quantities to compute compensated phase shift and attenuation quantities.

19. The method of claim 16, wherein the electromagnetic voltage measurements acquired in (b) comprise a three-dimensional matrix of voltage measurements.

20. The method of claim 16, wherein the gain compensated measurement quantities computed in (h) comprise at least one measurement proportional to an xx coupling, a yy coupling, or an xx coupling minus a yy coupling.

21. The method of claim 16, wherein the gain compensated measurement quantities computed in (h) comprise at least one measurement proportional to an xy coupling, a yx coupling, an xy coupling minus a yx coupling, or an xy coupling plus a yx coupling.

22. The method of claim 16, wherein the gain compensated measurement quantities computed in (h) comprise at least one measurement proportional to a zx coupling, an xz coupling, a zy coupling, or a yz coupling.

23. The method of claim 16, wherein the gain compensated measurement quantities computed in (h) comprise at least one measurement sensitive to a product of an xz coupling and a zx coupling or a product of a yz coupling and a zy coupling.

24. The method of claim 16, wherein the gain compensated measurement quantities computed in (h) comprise (i) at least one measurement proportional to an xx coupling or a yy coupling, (ii) at least one measurement proportional to an xy coupling or yx coupling, (iii) at least one measurement proportional to a zx coupling, an xz coupling, a zy coupling, or a yz coupling, and (iv) a measurement proportional to an zz coupling.

25. The method of claim 16, further comprising:
(i) processing the compensated measurement quantities computed in (h) to compute compensated symmetrized and anti-symmetrized measurement quantities.

* * * * *